United States Patent
Evans et al.

(10) Patent No.: US 7,914,598 B2
(45) Date of Patent: Mar. 29, 2011

(54) AIR TREATMENT SYSTEM

(75) Inventors: Gregory K. Evans, Grand Rapids, MI (US); Bradley J. Pippel, Grandville, MI (US)

(73) Assignee: Access Business Group International LLC, Ada, MI (US)

( * ) Notice: Subject to any disclaimer, the term of this patent is extended or adjusted under 35 U.S.C. 154(b) by 0 days.

(21) Appl. No.: 12/419,488

(22) Filed: Apr. 7, 2009

(65) Prior Publication Data

US 2009/0188222 A1    Jul. 30, 2009

Related U.S. Application Data

(62) Division of application No. 11/456,984, filed on Jul. 12, 2006, now Pat. No. 7,537,649.

(60) Provisional application No. 60/699,193, filed on Jul. 14, 2005.

(51) Int. Cl.
*B01D 46/00* (2006.01)

(52) U.S. Cl. ............... 55/471; 55/472; 55/DIG. 37

(58) Field of Classification Search ............ D23/355; 55/467; 454/283
See application file for complete search history.

(56) References Cited

U.S. PATENT DOCUMENTS

| | | | | |
|---|---|---|---|---|
| 2,362,933 A * | 11/1944 | Schaefer | ............... | 96/131 |
| 2,463,337 A * | 3/1949 | Weber | ............... | 417/423.15 |
| 3,626,669 A * | 12/1971 | Cardiff | ............... | 96/58 |
| 3,812,370 A * | 5/1974 | LaViolette | ............... | 422/186.12 |
| 3,950,155 A | 4/1976 | Komiyama | | |
| 4,022,548 A * | 5/1977 | McLarty | ............... | 416/247 R |
| 4,385,911 A * | 5/1983 | Popeil et al. | ............... | 96/131 |
| 4,488,888 A * | 12/1984 | Doyle | ............... | 55/481 |
| 4,737,616 A * | 4/1988 | Wen-Ying | ............... | 392/365 |
| 5,266,090 A * | 11/1993 | Burnett | ............... | 55/333 |
| 5,460,571 A * | 10/1995 | Kato et al. | ............... | 454/184 |
| 5,512,086 A | 4/1996 | Glucksman | | |
| 6,494,940 B1 | 12/2002 | Hak | | |
| 6,962,619 B1 | 11/2005 | DeRosa et al. | | |
| 7,537,647 B2 * | 5/2009 | Adair et al. | ............... | 96/62 |
| 2003/0070544 A1 | 4/2003 | Mulvaney | | |
| 2005/0172816 A1 | 8/2005 | Son et al. | | |

* cited by examiner

*Primary Examiner* — Duane Smith
*Assistant Examiner* — Sonji Turner
(74) *Attorney, Agent, or Firm* — Warner Norcross & Judd LLP

(57) ABSTRACT

An air treatment system includes features for maximizing efficiency and effectiveness. In one embodiment, a sensor air passage utilizes a low pressure region created by the blower to draw air through the passage. In another embodiment, a filter frame includes a plurality of connectors formed integrally with the filter frame. In another embodiment, a screen is positioned adjacent to the blower intake. The screen includes a plurality of angled strands oriented in a particular direction. In another embodiment, a remote control holder is formed integrally with the housing. In another embodiment, a gasket is positioned between the blower and the housing, forming a seal between the blower and the housing.

12 Claims, 24 Drawing Sheets

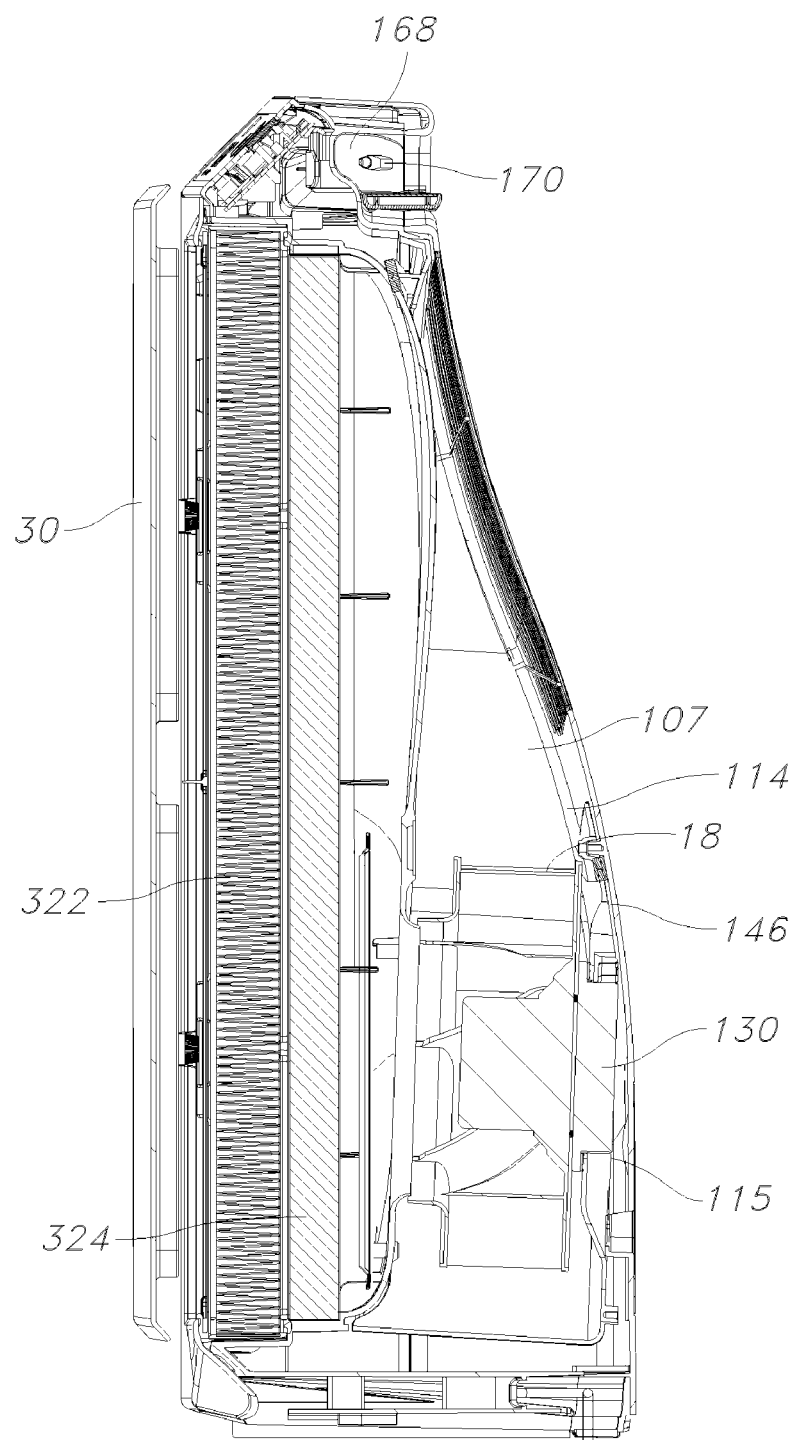
FIG. 3

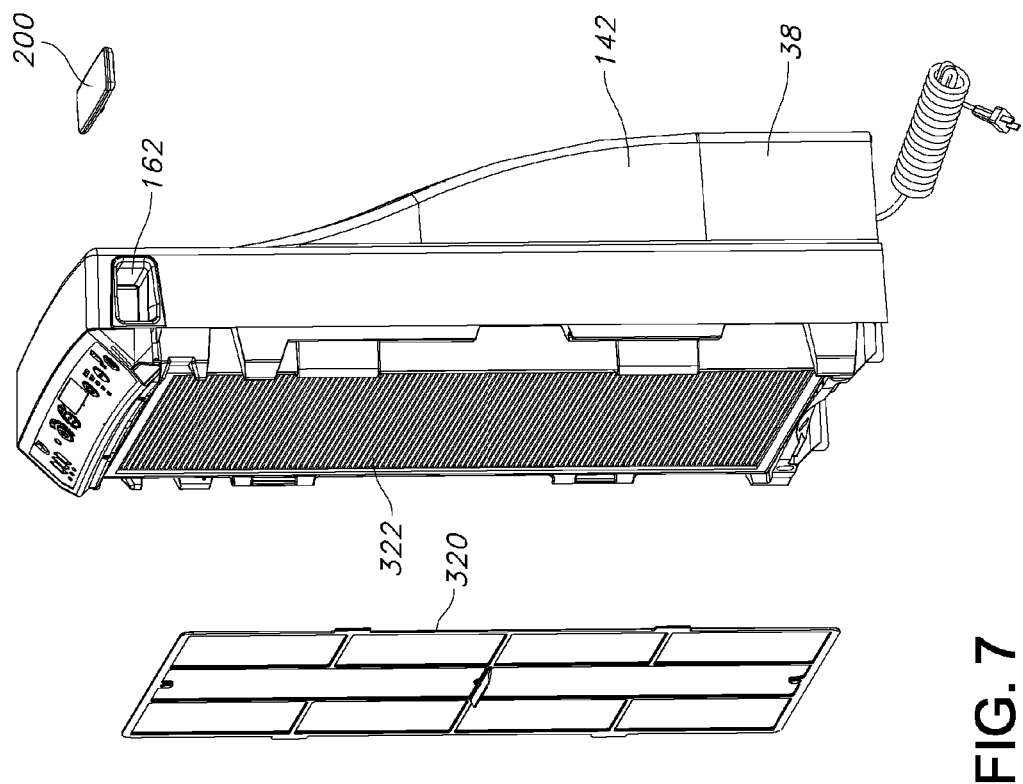
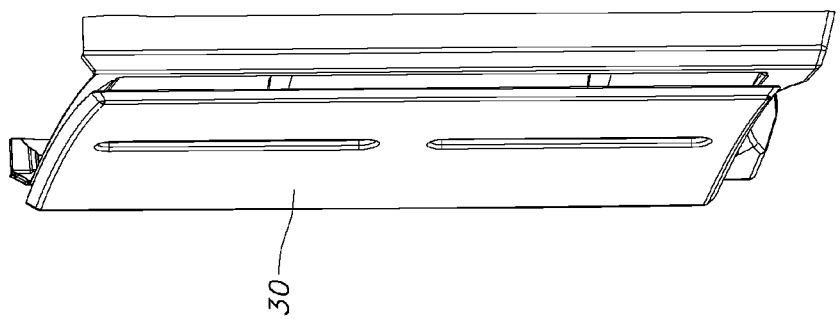
FIG. 7

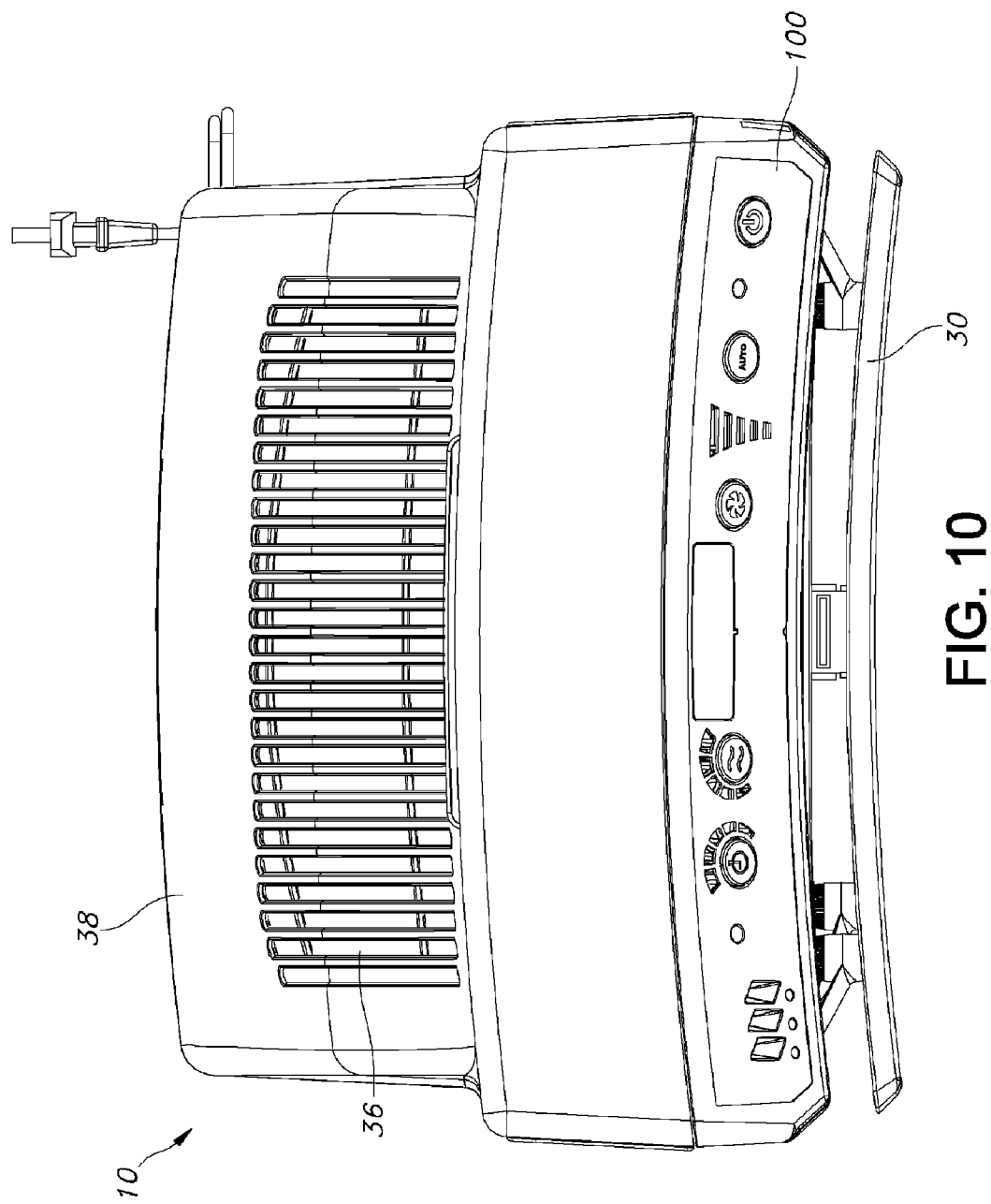

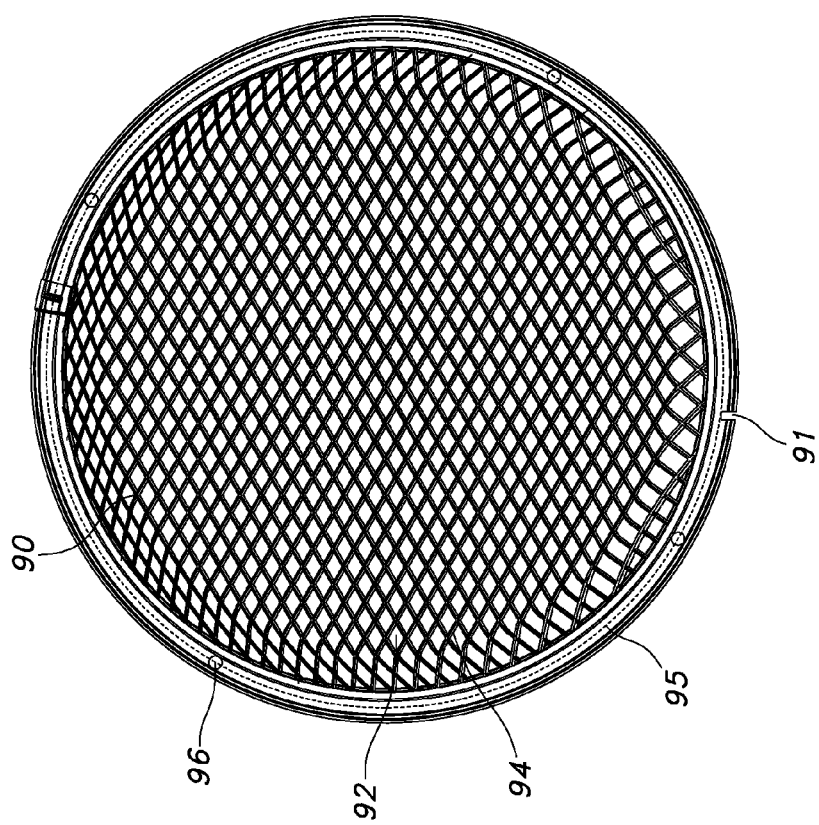
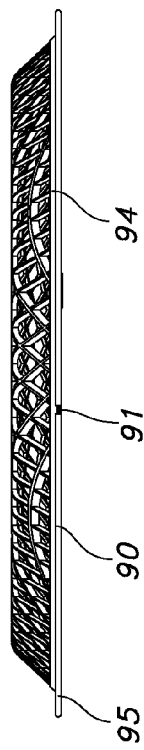
FIG. 12
FIG. 13

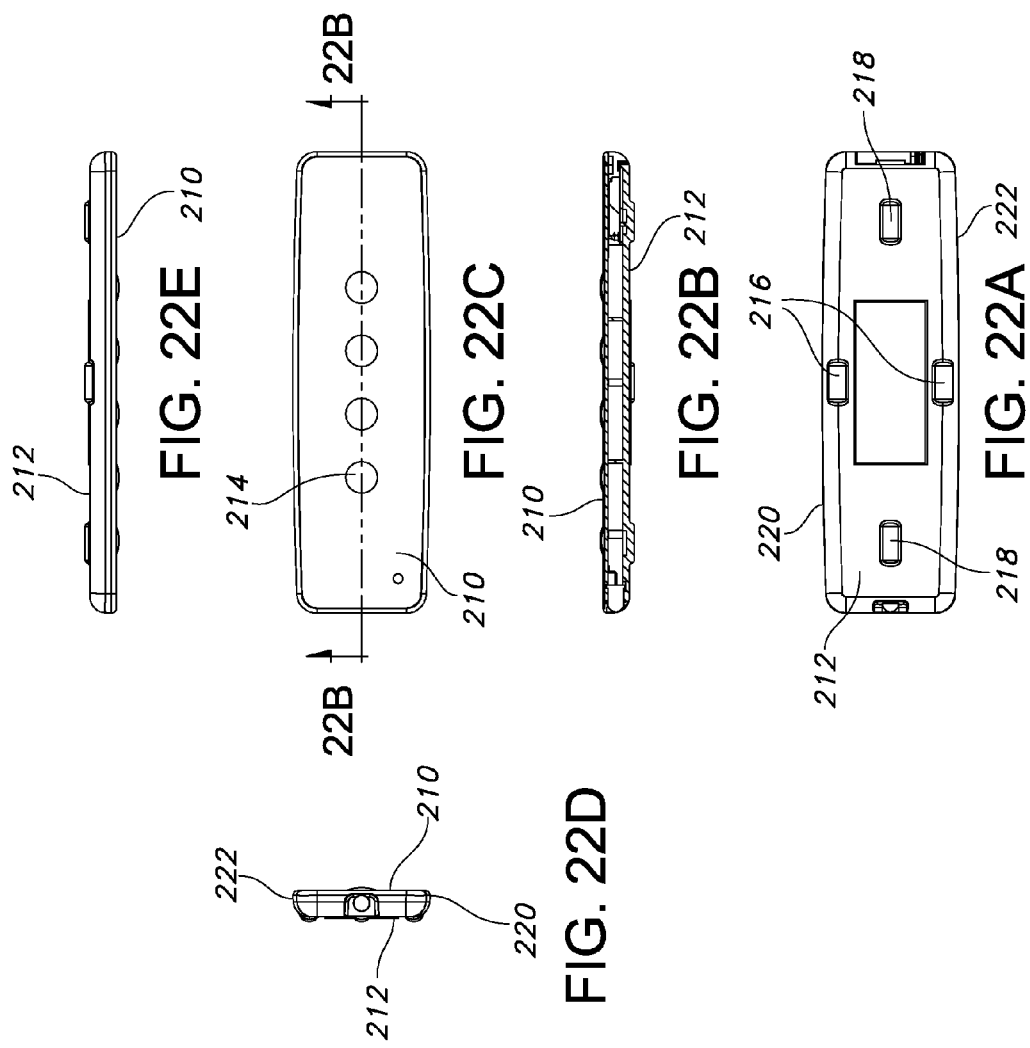

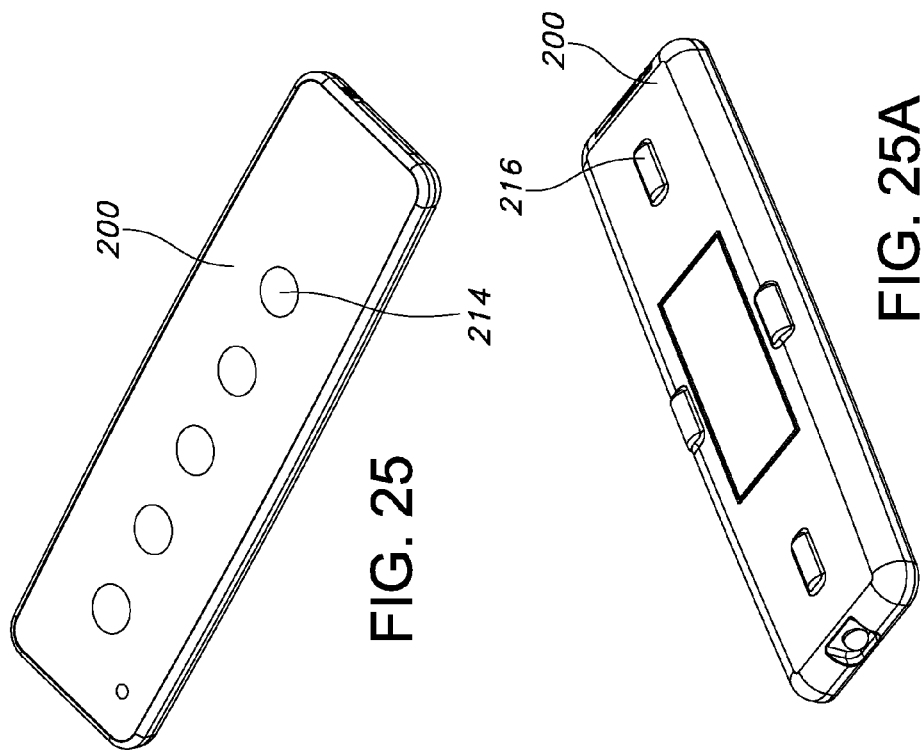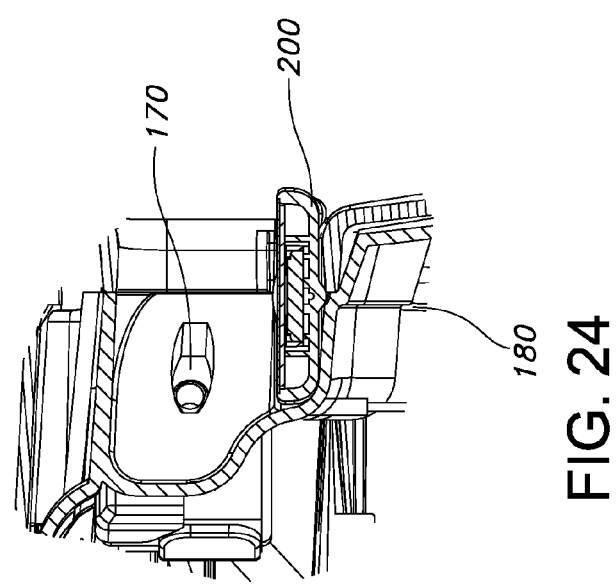

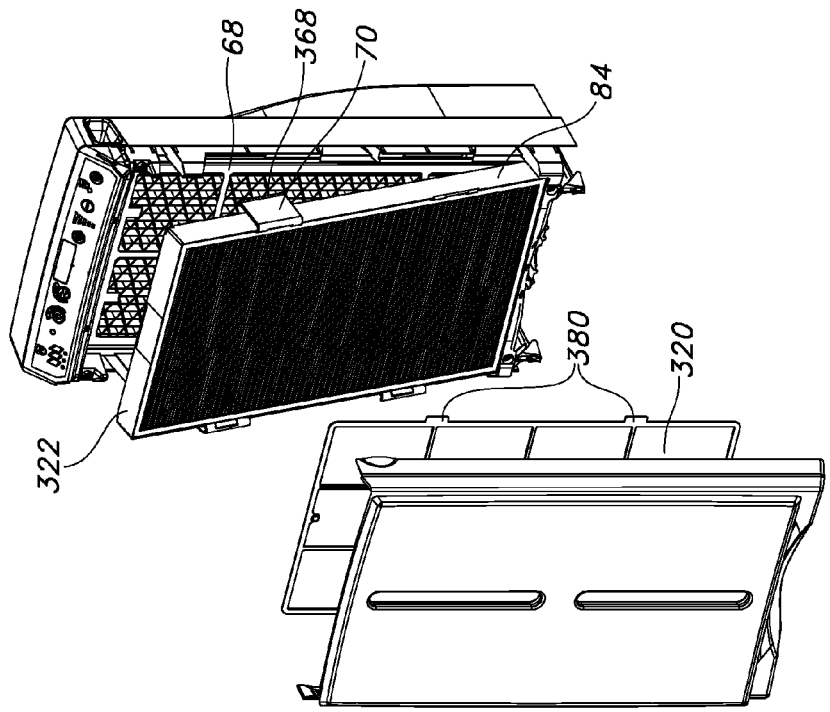
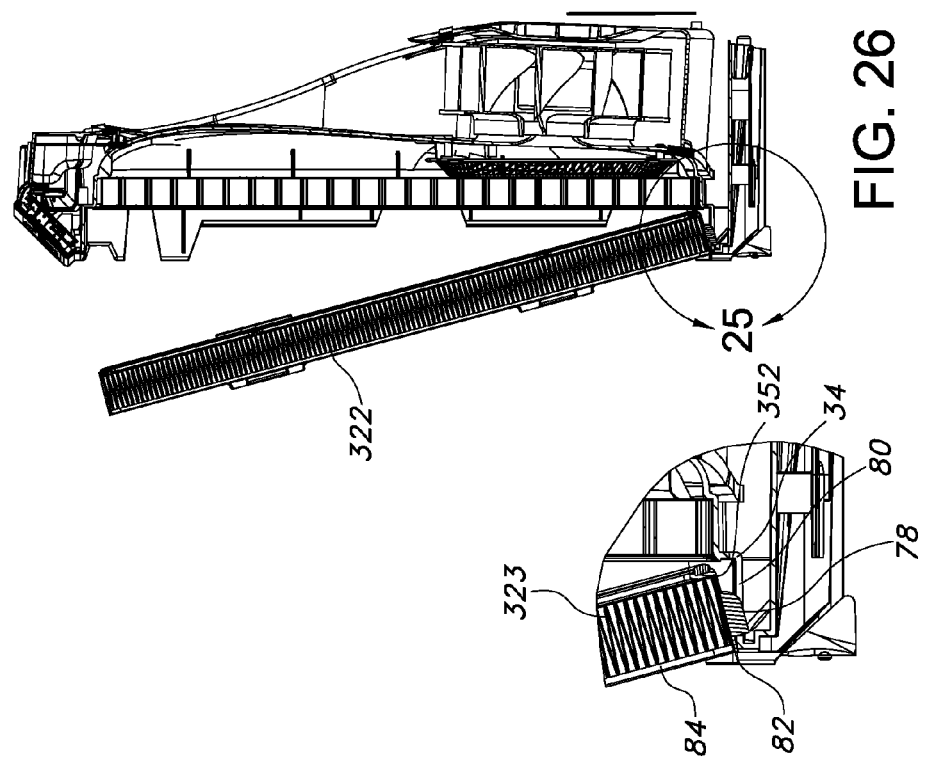
FIG. 27
FIG. 26
FIG. 28

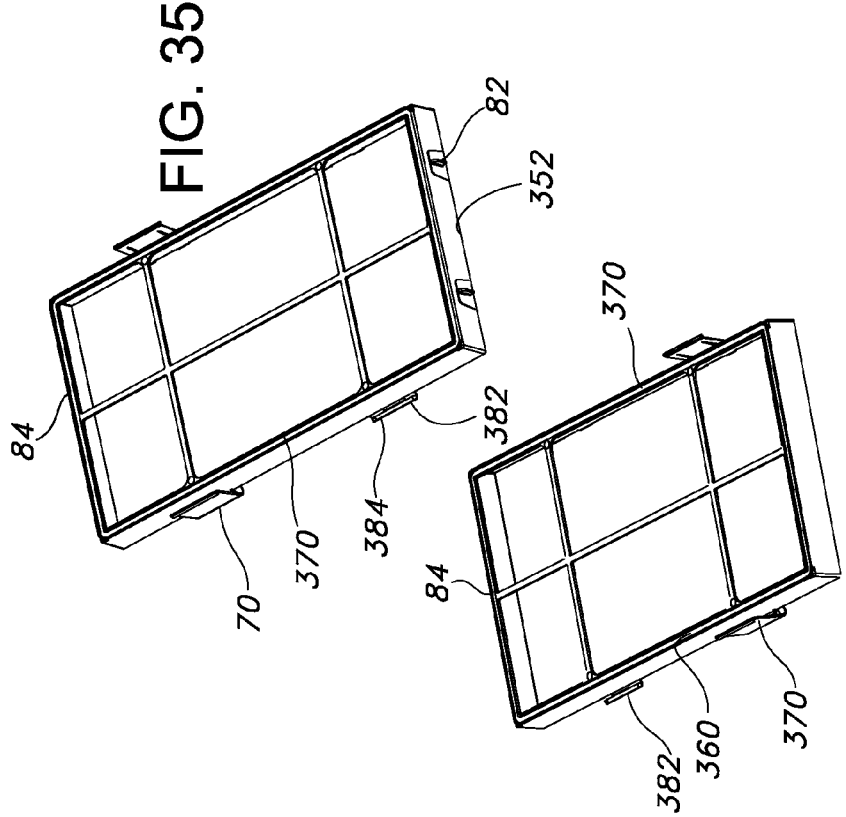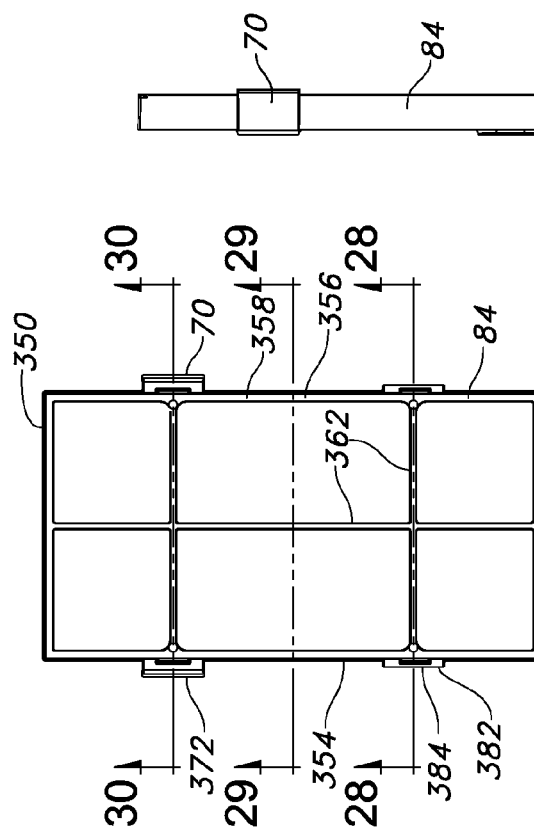

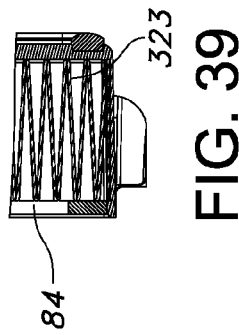
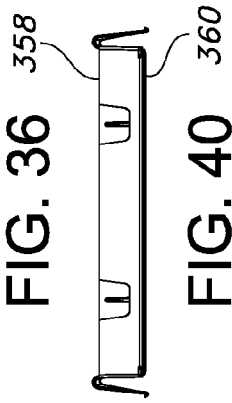
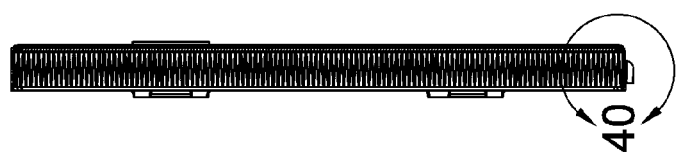
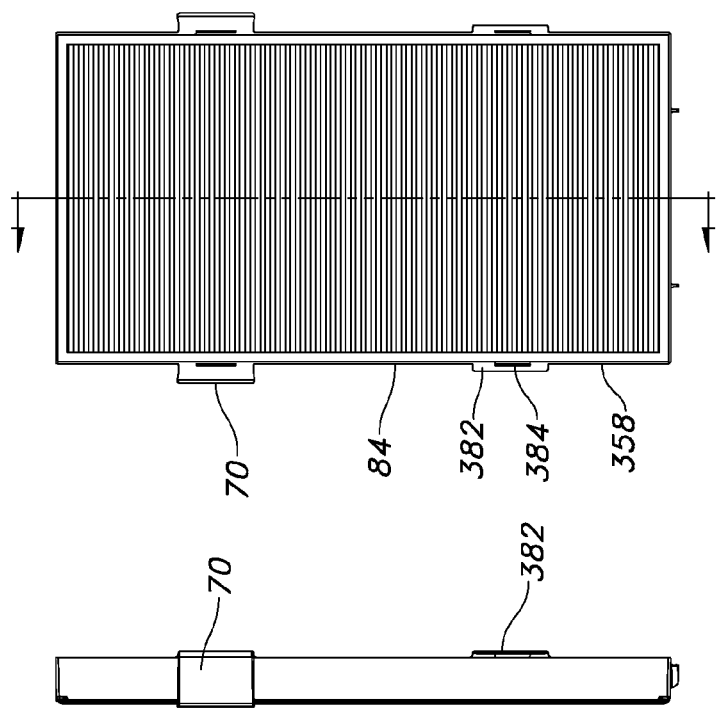

AIR TREATMENT SYSTEM

The present application is a divisional of U.S. patent application Ser. No. 11/456,984, filed Jul. 12, 2006, which claims the benefit of U.S. Provisional Application No. 60/699,193 filed Jul. 14, 2005.

BACKGROUND OF THE INVENTION

The present invention relates to air treatment systems, and more particularly to a portable room air filtering system.

Air treatment systems have grown in popularity in recent years. A growing concern for health and an increased recognition of the risks associated with unclear air are largely responsible for this trend. For example, airborne pollutants can cause or contribute to a number of respiratory problems, including respiratory infections, asthma, and allergies. Additionally, some airborne pollutants can cause undesirable odors. While air treatment systems are available in a wide variety of designs, a conventional air treatment system includes a blower that moves air through a filter element. The blower and filter element are typically contained in a housing and are arranged with the blower either drawing or pushing air through the filter element. A number of different filter elements with different filtering characteristics are commercially available. For example, particulate filters are available to remove particulate matter from air. A conventional particulate filter includes a substance, such as fiberglass or electret-type media, that traps particulate matter as air is passed therethrough. Another example, odor filters are available to remove odors from the air. A conventional odor filter includes activated carbon, or activated charcoal, which removes pollutants from the air primarily by adsorption.

As air treatment systems become more widely used, consumers are continually searching for systems that maximize efficiency while minimizing noise and size.

SUMMARY OF THE INVENTION

The aforementioned problems are overcome by the present invention, wherein an air treatment system includes features for maximizing efficiency and effectiveness.

In one embodiment, the present invention includes a sensor air passage that utilizes a low pressure region created by the blower to draw air through the passage. The blower includes an inlet and an outlet, and is operable to draw air into the inlet and force air out of the outlet. A filter is positioned relative to the blower such that the blower is capable of drawing air through the filter. The sensor flow passage includes a sensor inlet, a sensor for sensing contamination of ambient air, and a sensor outlet. The sensor outlet is positioned relative to the blower outlet such that the air forced out of the blower outlet is forced to travel proximate to the sensor outlet. The air forced out of the blower outlet creates a low pressure region proximate to the sensor outlet to draw ambient air through the sensor flow passage. A method for drawing ambient air through a sensor air flow passage is also disclosed.

In another embodiment, the present invention includes filter having a filter media and a filter frame. The filter frame supports the filter media, and includes a plurality of connectors formed integrally with the filter frame. The connectors are adapted to removably attach the filter frame to the air treatment system.

In another embodiment, the present invention includes a blower having an intake, a screen positioned adjacent to the blower intake, the screen including a plurality of angled strands, and means for locating the screen with respect to the blower such that the angled strands are oriented in a particular direction.

In another embodiment, the present invention include a remote control that is capable of controlling an operation of the air treatment system, a housing supporting a blower and a filter, and a remote control holder formed integrally with the housing. The remote control holder includes a recess capable of receiving and supporting the remote control.

In another embodiment, the present invention includes a blower, a filter, and a housing. The blower includes an inlet and an outlet and is operable to draw air into the inlet and force air out the outlet. The filter is positioned relative to the blower such that the blower is capable of drawing air through the filter. The housing supports the blower and the filter. A gasket is positioned between the blower and the housing, forming a seal between the blower and the housing.

These and other objects, advantages, and features of the invention will be readily understood and appreciated by reference to the detailed description of the current embodiment and the drawings.

BRIEF DESCRIPTION OF THE DRAWINGS

FIG. 3 is a side cross-sectional view thereof.

FIG. 7 is an exploded view of the front shield and trim piece, the prefilter, and remote.

FIG. 10 is a top view of the system.

FIG. 12 is a front view of the finger guard.

FIG. 13 is a bottom view of the finger guard.

FIG. 15a is a side cross sectional view of the motor gasket along line B-B in FIG. 15.

FIG. 15b is a side cross sectional view of the motor gasket along line A-A in FIG. 15.

FIG. 15c is a close up view of the portion of the motor gasket in circle C in FIG. 15a.

FIG. 15d is a close up view of the portion of the motor gasket in circle D in FIG. 15b.

FIG. 22a is a bottom view of one embodiment of the remote.

FIG. 22b is a side cross sectional view thereof.

FIG. 22c is a top view thereof.

FIG. 22d is a front view thereof.

FIG. 22e is a side view thereof.

FIG. 22f is a rear view thereof.

FIG. 24 is a side cross-sectional view of the remote control holder.

FIG. 25 is a top perspective view of the remote control.

FIG. 25a is a bottom perspective view of the remote control.

FIG. 26 is a side cross-sectional view of the particulate filter partially installed in the filter housing.

FIG. 27 is a front exploded view of the particulate filter partially installed into the filter housing with the prefilter and front shell and trim piece removed.

FIG. 28 is a close-up cross-sectional view of the bottom of the particulate filter partially installed in the filter housing.

FIG. 29 is a rear view of the particulate filter frame.

FIG. 30 is a bottom cross-sectional view of the particulate filter frame along line C-C in FIG. 29.

FIG. 31 is a bottom cross-sectional view of the filter frame along line A-A of FIG. 29.

FIG. 32 is a bottom cross-sectional view of the filter frame along line B-B of FIG. 29.

FIG. 33 is a side view of the particulate filter frame.

FIG. 34 is a rear perspective view of the particulate filter frame.

FIG. 35 is a rear perspective view of the particulate filter frame.

FIG. 36 is a front view of the particulate filter frame.

FIG. 37 is a top view of the particulate filter frame.

FIG. 38 is a side cross-sectional view of the particulate filter and frame.

FIG. 39 is a close-up side cross-sectional view of the portion of the particle filter and frame circled in FIG. 38.

FIG. 40 is a bottom view of the particulate filter frame.

DETAILED DESCRIPTION OF THE CURRENT EMBODIMENT

Figure 1:
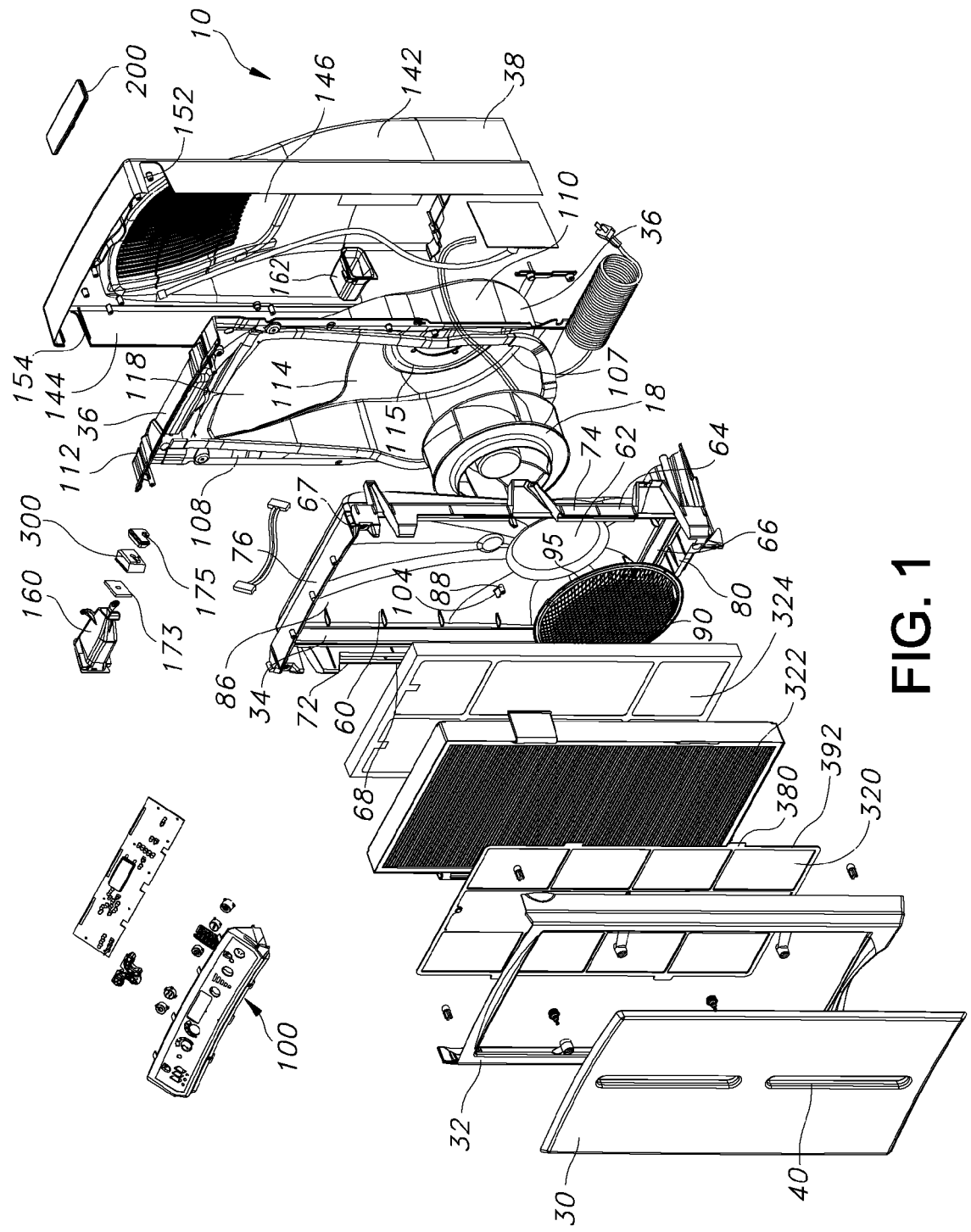
FIG. 1 is an exploded view of the air treatment system in accordance with one embodiment of the present invention.
Figure 5:
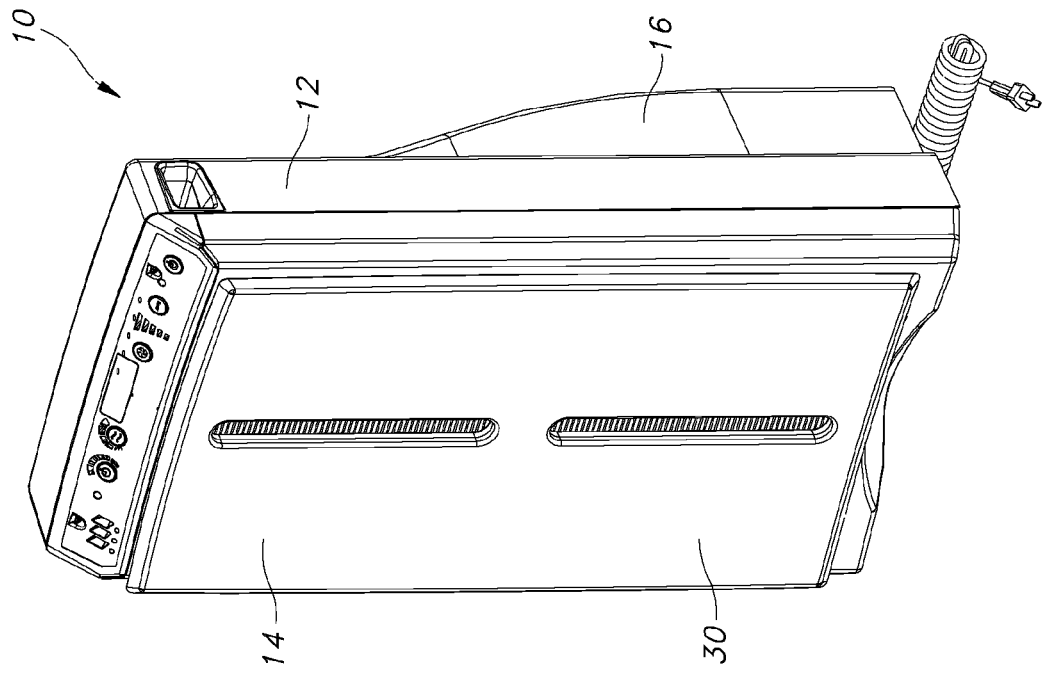
FIG. 5 is a front perspective view thereof.

An air treatment system according to one embodiment is illustrated in FIGS. 1 and 5, and generally designated 10. The air treatment system 10 includes a housing 12 having a front portion 14, a rear portion 16, and a blower 18. The blower 18 circulates external air through the housing 12 by drawing it in through the front portion 14 and forcing it out through the rear portion 16. A prefilter 320, particulate filter 322, and odor filter 324 are positioned along the air flow path to treat the air as it is moved through the housing 12. The system 10 is operated by an electronic control system 100.

The housing 12 is generally comprised of a front shield 30, a front trim piece 32, a filter housing 34, an outlet duct 36, and a rear shell 38. The housing 12 may be made from a wide variety of materials. As illustrated, the components of the housing 12 are formed from multiple pieces of plastic, however, some or all of the components may be formed as one integral piece. The front shield 30 and front trim piece 32 form the front portion 14 of the housing 12. The filter housing 34, outlet duct 36, and rear shell 38 form the rear portion 16 of the housing 12. As described in more detail below, the blower 18 draws external air through the front portion 14, through the various filters, and forces it out the rear portion 16.

Figure 2:
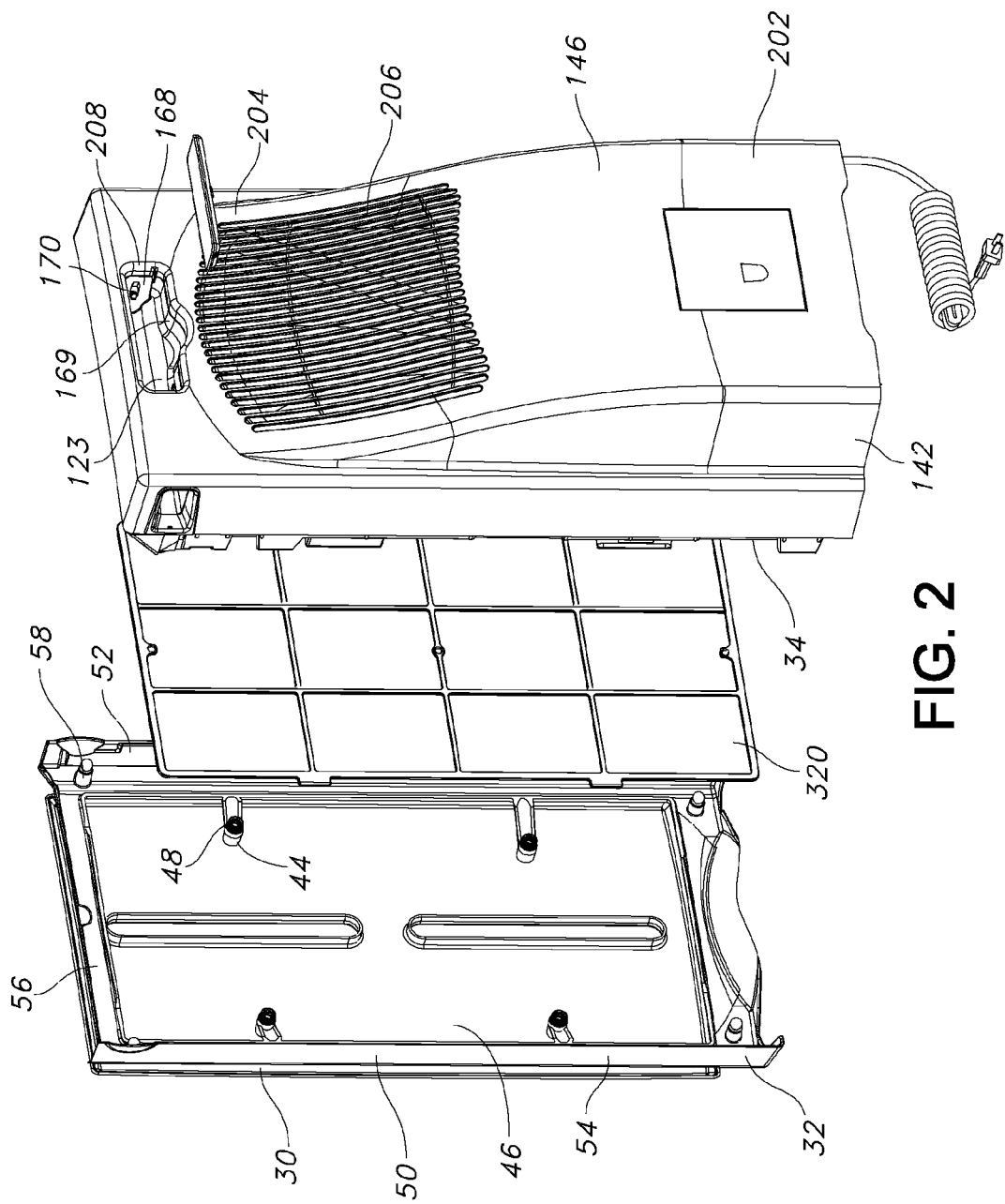
FIG. 2 is a rear perspective exploded view of the present invention.
Figure 4:
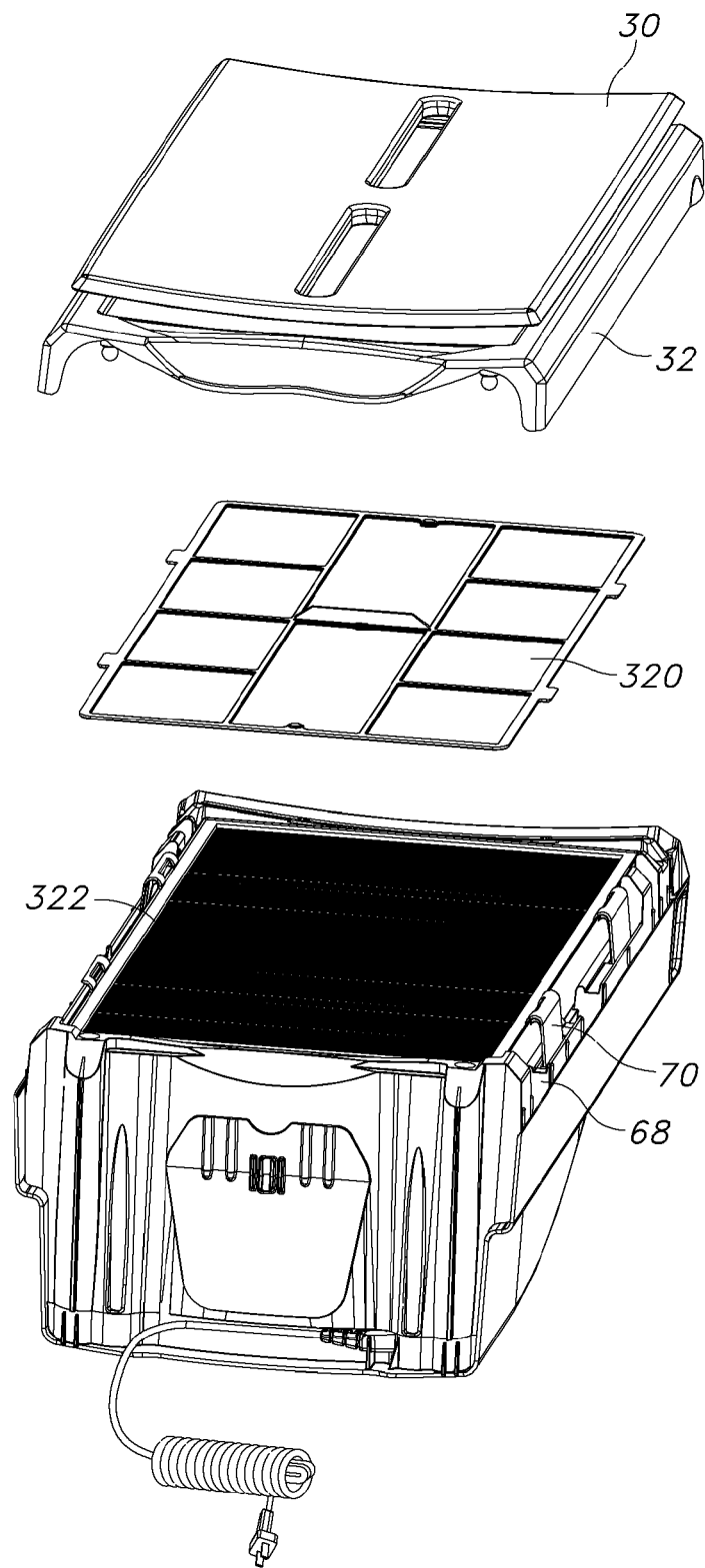
FIG. 4 is a bottom perspective exploded view thereof.

As shown in FIGS. 1 through 12, the front shield 30 forms a front surface of the housing 12 and acts as a cover for the various filters. The front shield 30 has one or more openings 40 that allow air to pass through the shield and into the housing 12, and may alternatively be a grill having a plurality of slots. Shown in FIG. 2, the front shield 30 has a plurality of thumb screws 44 on its rear surface 46 that extend into receptacles 48 on the front trim piece 32. The front trim piece 32 connects the front shield 30 to the rest of the housing 12. As shown in FIG. 2, the front trim piece 32 is a peripheral frame including receptacles 48 extending from side frame members 50, 52. The receptacles 48 project toward the middle of the frame and also angle outwardly toward the front shield 30 to receive the front shield 30 and create a gap 54 between the front shield 30 and the front trim piece 32 around the periphery of the trim piece 32 enabling air to enter the housing through both the openings 40 in the front shield 30 and the gap 54. The trim piece 32 includes a rear surface 56 having posts 58 for attaching the trim piece 32 to the filter housing 34.

Figure 6:
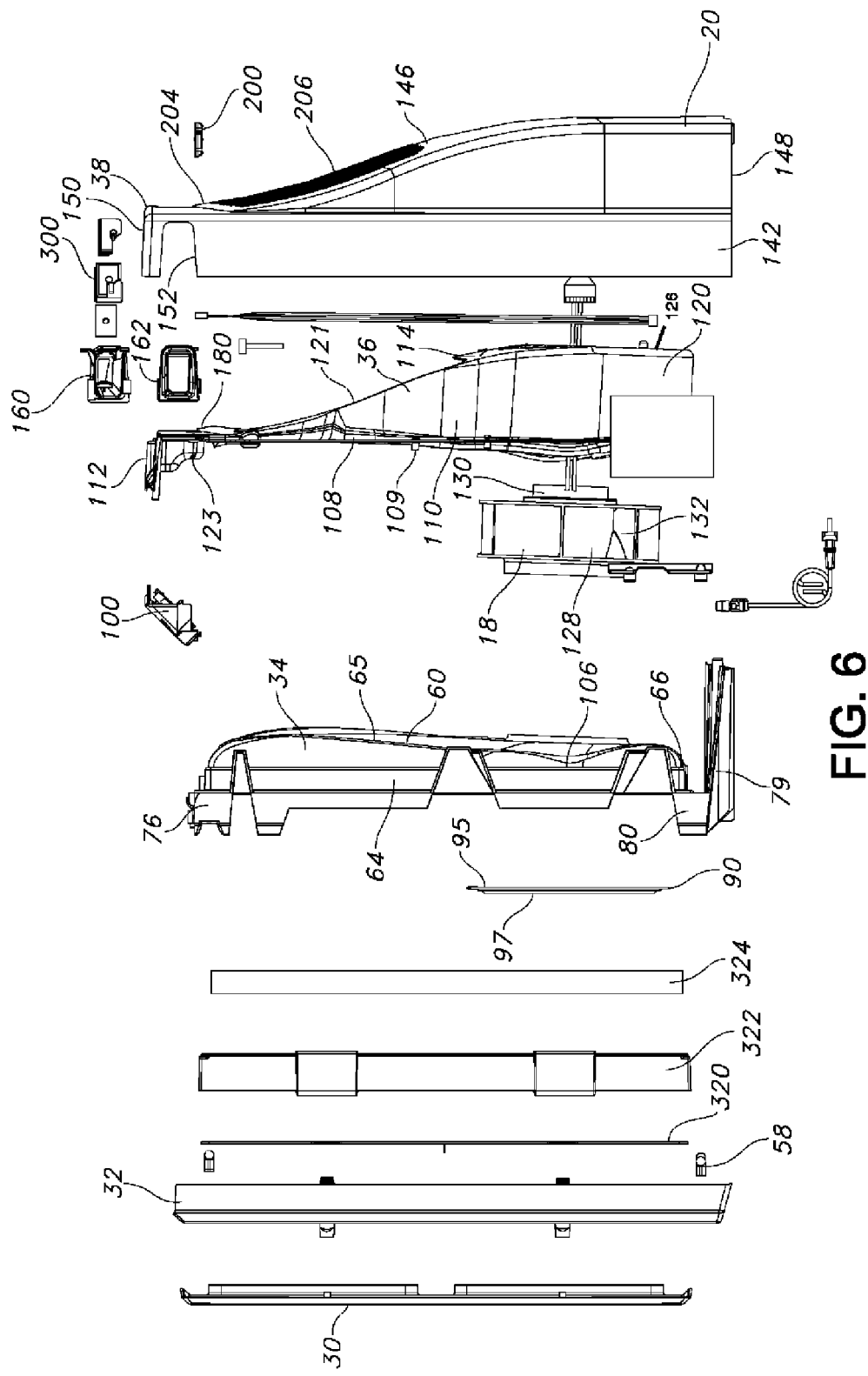
FIG. 6 is a side exploded view thereof.
Figure 8:
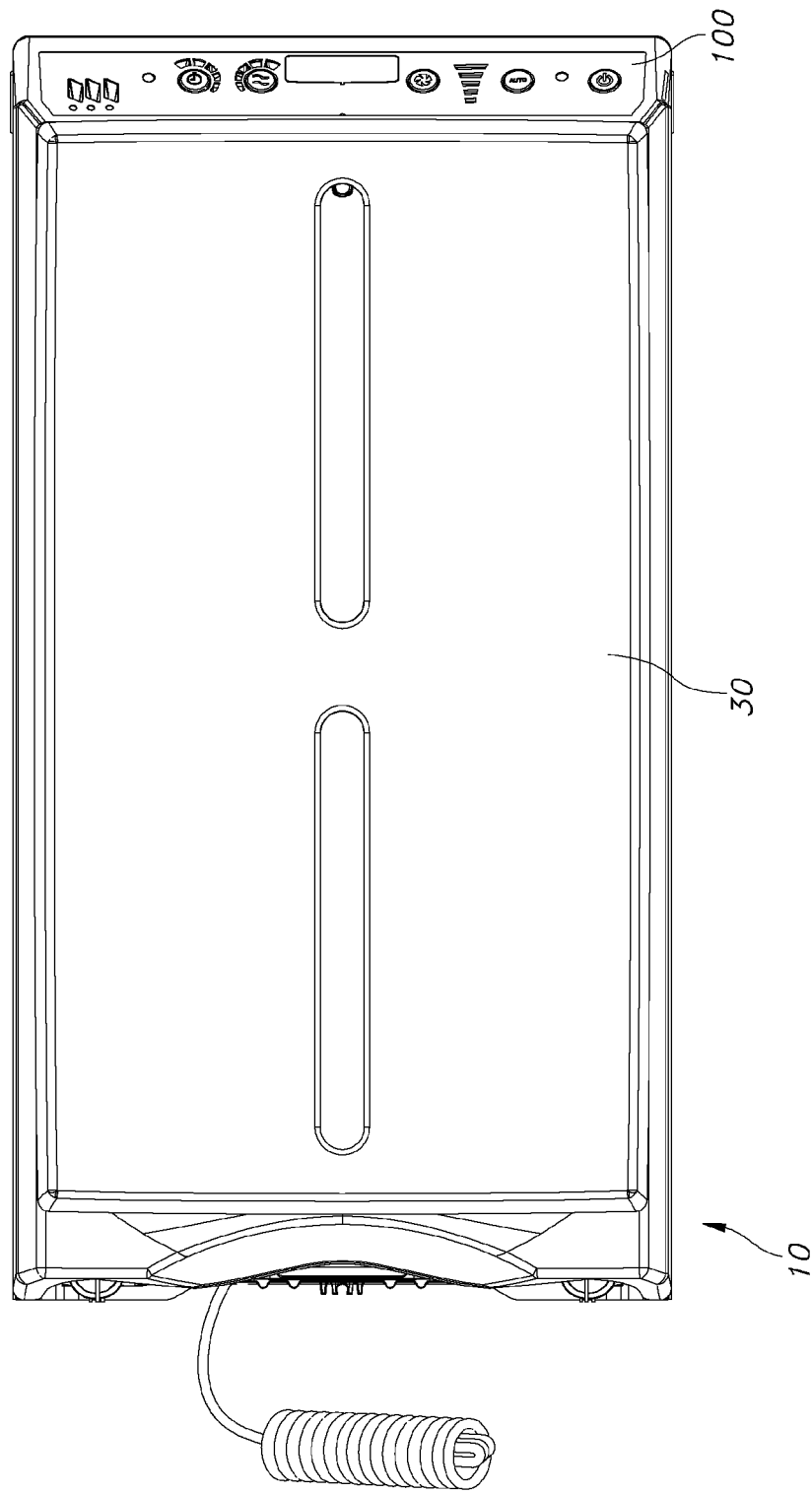
FIG. 8 is a front view of the system.
Figure 9:
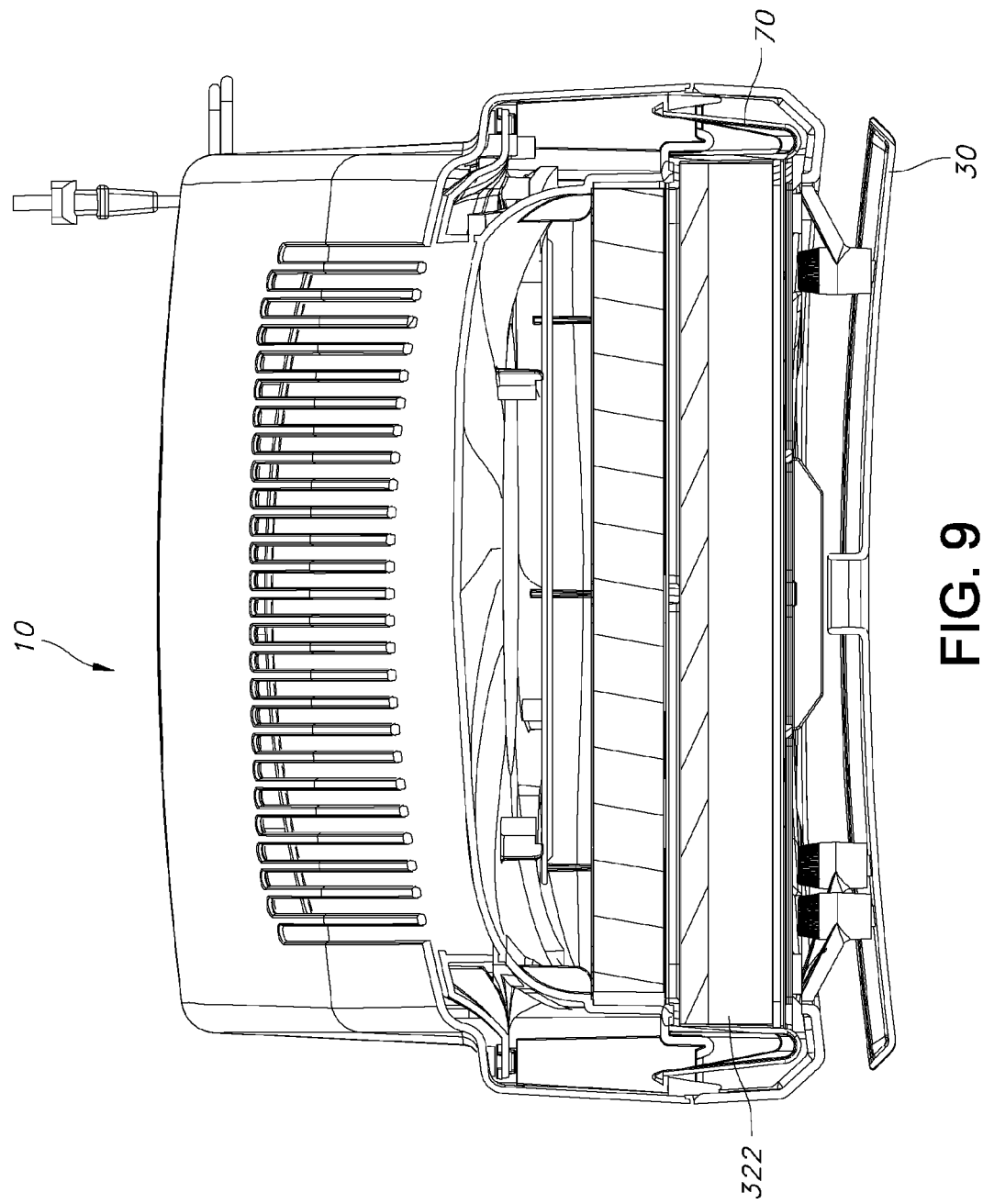
FIG. 9 is a top cross-sectional view of the system.

Referring now to FIGS. 1 and 8, the filter housing 34 includes a panel 60 with a cutout 62 that defines a blower opening, and a peripheral flange 64 extending around most of the periphery of the panel 60. As shown in FIG. 6, the panel 60 may have a curved shape. The blower opening 62 is positioned in the panel 60 near the lower edge 66 of the filter housing 34. The peripheral flange 64 includes a plurality of receptacles 67 for receiving the posts 58 of the trim piece 32. When connected, the posts 58 extend into the receptacles 67 to maintain a distance between the panel 60 and the trim piece 32 and create a space between the panel 60 and the trim piece 32 for holding the various filters. The flange 64 also includes slots 68 (shown in FIGS. 4 and 27) for receiving snap hooks 70 on the particulate filter 322 (discussed below). As shown, the slots 68 are located on opposite side members 72, 74 of the peripheral flange 64, spaced approximately ¼ of the length of the side members 72, 74 from the top member 76. As shown in FIGS. 25 and 26, the filter housing 34 may also include slots 78 in the bottom member 80 of the peripheral flange 64. As described below, the slots 78 receive engagement tabs 82 extending from the particle filter frame 84. Shown in FIG. 6, the filter housing 34 further includes a foot 79 extending downwardly from the bottom member 80. The foot 79 provides a surface for standing the housing 12 upright on a floor.

Figure 11A:
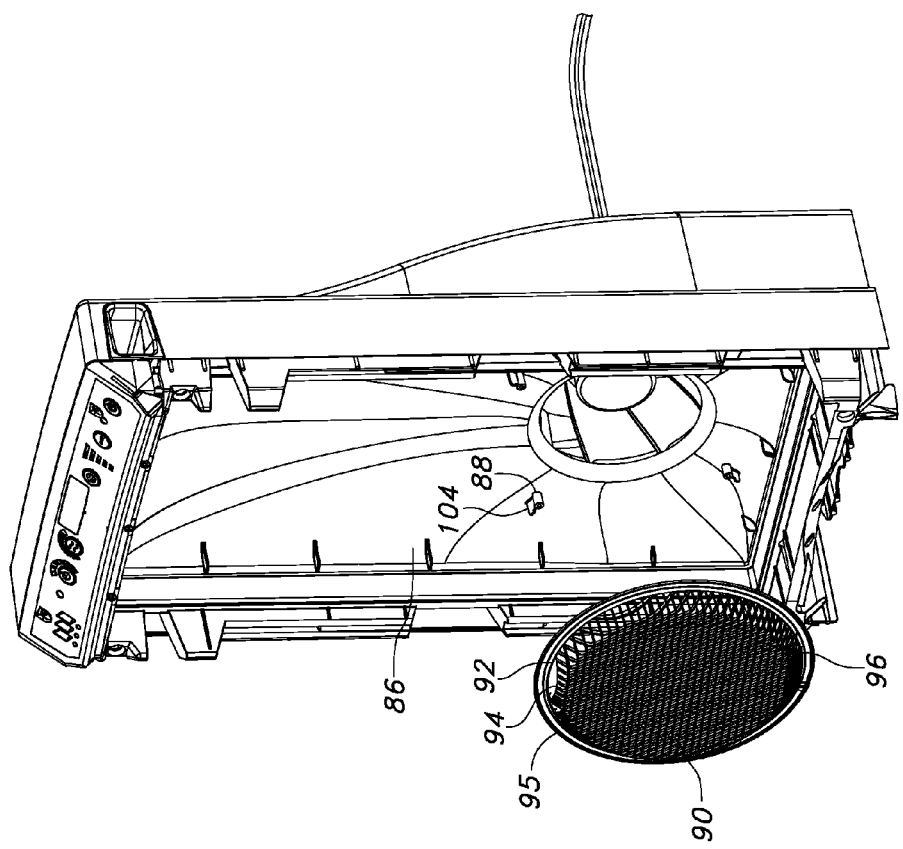
FIG. 11a is an exploded view of the filter housing and finger guard.
Figure 11:
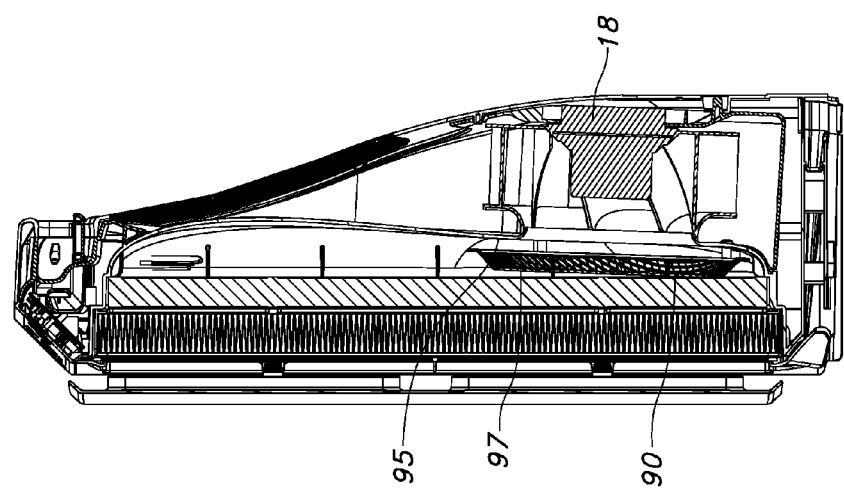
FIG. 11 is a side cross sectional view of the system.

As shown in FIGS. 13 and 13a, the front surface 86 of the filter housing 34 includes a plurality of screw bosses 88 around the periphery of the cutout 62. The screw bosses 88 receive a plurality of screws (not shown) for attaching a finger guard 90 over the cutout 62. As shown in FIGS. 11-1a, the finger guard 90 prevents users from contacting the blower 18. Shown in more detail in FIGS. 12 and 13, the finger guard 90 is typically a expanded metal mesh. The mesh is formed by cutting slits in a sheet of metal and then stretching the metal to pull the slits apart, forming a plurality of diamond shaped openings 92. The mesh remains a single piece of metal with intersecting strands 94 held together about the periphery 95. As with most expanded metal products, the intersecting mesh strands each have a strand thickness and a strand width. The strand thickness is generally greater than the strand width. When the mesh is formed, the strands 94 are often angled in the same direction, such that air flowing through the mesh is met with different resistances depending on its direction relative to the angle of the mesh strands 94. Air flowing in one direction will need to flow around the entire strand thickness in order to pass through the mesh, while air flowing in another direction will only need to flow around the strand width. Accordingly, finger guard 90 assists in controlling the direction of the flow of air entering blower 18. According to the illustrated embodiment, finger guard 90 is oriented such that air entering the blower 18 is drawn preferably from the top of the interior of filter housing 34. The contoured shape of the interior of filter housing 34, coupled with the alignment of finger guard 90 as described above, helps to distribute the flow of air evenly across the filters. In one embodiment, the periphery 95 of the finger guard 90 includes a number of screw holes 96. The screw holes are keyed to the angle of the mesh strands, such that when they are aligned with the screw bosses 88, the finger guard 90 is oriented with respect to the direction of the air flow to minimize the resistance of air flowing through the finger guard 90. As shown in FIGS. 12 and 13, the finger guard 90 may also include a locator notch 91 in the periphery 95 that engages one or more of the protrusions 104 extending from the front surface 86 of the filter housing 34 to aid in locating each of the screw holes with a correct one of the screw bosses 88. The protrusion could alternatively extend from other portions of the housing 34, such as one of the screw bosses 88. In addition, as shown in FIG. 11, the finger guard 90 may have a contoured surface, such that the finger guard 90 is in contact with the filter housing 34 at the periphery 95, but extends away from the filter housing 34 in the central portion 97. The curvature creates extra space between the finger guard 90 and the blower 18 to increase the efficiency of the blower 18. The combination of protrusions 104 and screw bosses 88 affirm proper angular and directional orientation of the finger guard about the axis of the cutout 62.

Figure 20:
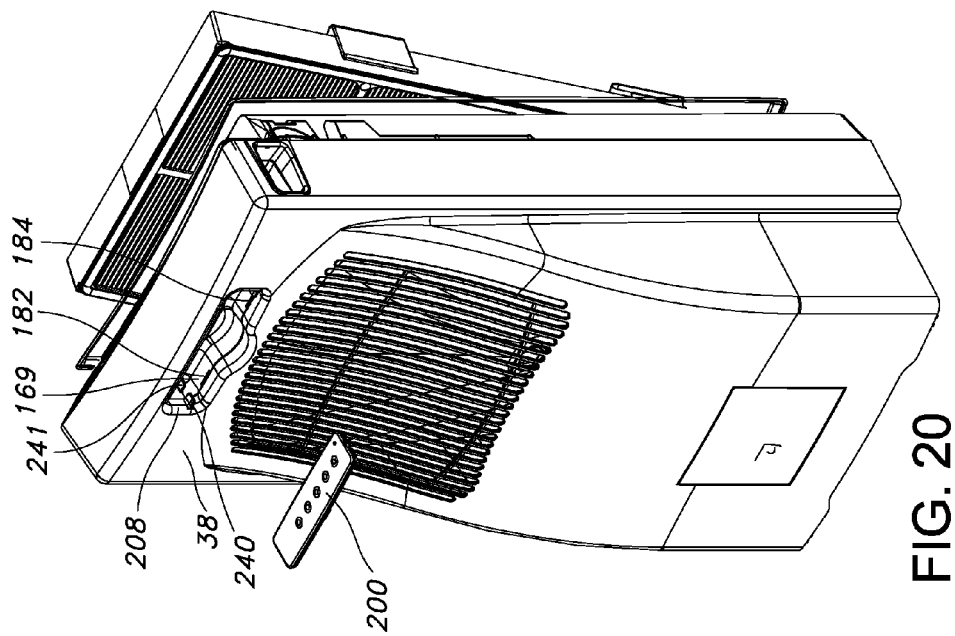
FIG. 20 is an exploded view of the remote control and remote control holder.
Figure 23A:
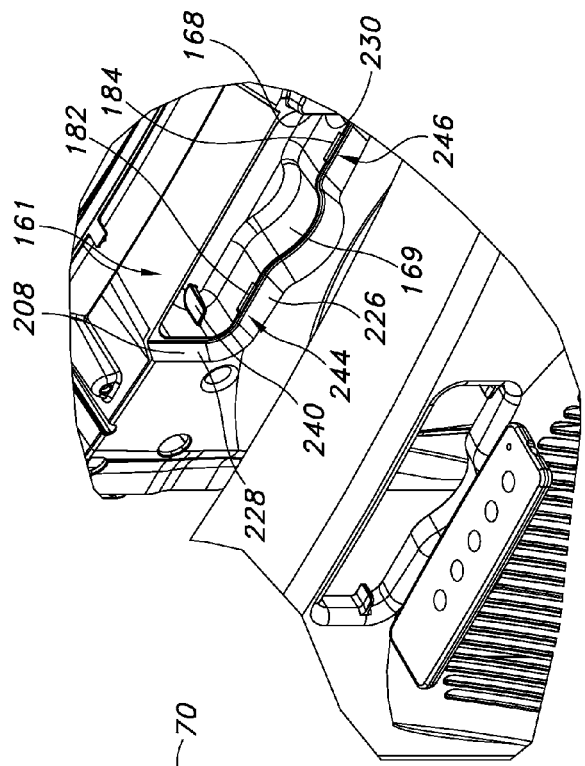
FIG. 23a is a close-up view of the remote control holder circled in FIG. 23.
Figure 23:
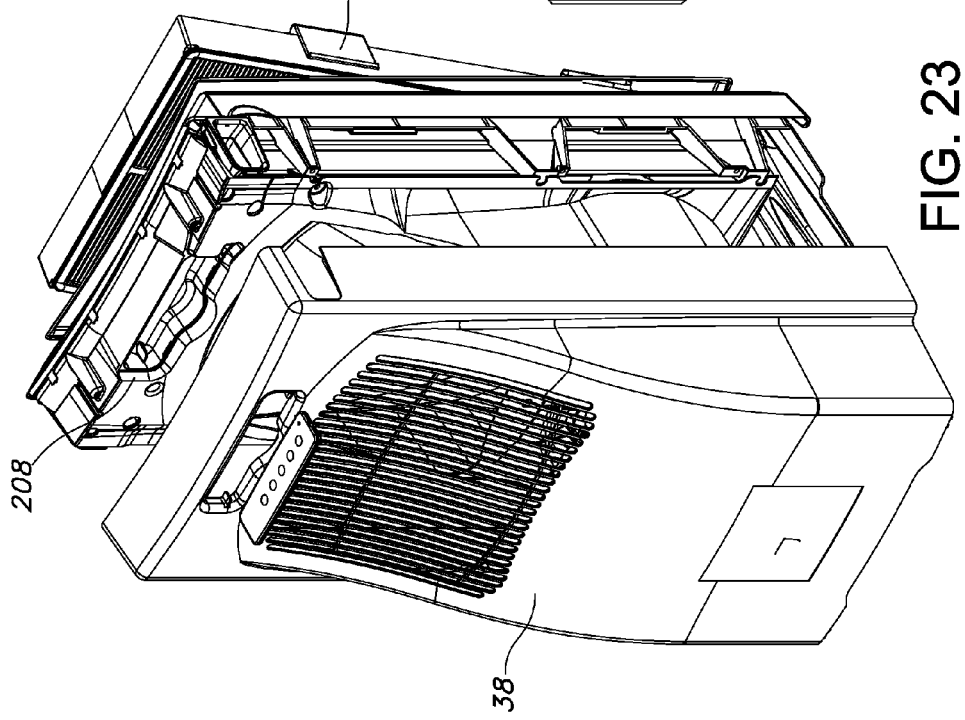
FIG. 23 is a rear perspective view of the unit and remote control holder.

The outlet duct 36 connects to a rear surface 106 of the filter housing 34 and defines a chamber 107 (shown in FIG. 3) for the blower 18. Referring to FIGS. 1 and 8, the outlet duct 36 generally includes a peripheral rim 108, a sidewall 110, and rear panel 114. The peripheral rim 108 is approximately the same size as the gasket crush rib 65 on the filter housing 34, except when fit together, the upper edge 112 of the outlet duct 36 extends above the top member 76 of the filter housing 34. The rim 108 includes a plurality of screw bosses 109 for receiving screws (not shown) extending through corresponding screw holes (not shown) in the filter housing 34. A gasket (not shown) comprised of foam, rubber, or another sealing material may be attached to the rim 108 and extend around the rim 108 such that it engages the gasket crush rib 65 of the filter housing 34 to create an airtight seal between the filter housing 34 and the outlet duct 36 when they are connected. The sidewall 110 extends from the rim 108 approximately perpendicular to the rim 108. As shown in FIG. 6, the sidewall 110 tapers in width as is approaches the upper edge 112 of the outlet duct 36. The rear panel 114 extends from the sidewall 110 opposite the rim 108. The rear panel 114 includes a first cutout 115 for mounting the blower 18, and a second cutout 118 defining an opening for exit air. Shown in FIG. 14, the first cutout 115 is generally circular, and located in a lower portion 120 of the rear panel 114. A plurality of screw holes 122 may be located around the first cutout 115 for receiving screws (not shown) that extend through the blower 18 to mount the blower 18 to the rear panel 114. The second cutout 118 is located in the upper portion 121 of the rear panel 114, and may cover substantially all of the upper portion 121. In one embodiment, shown in FIG. 6, the upper portion 121 of the rear panel 114 above the second cutout 118 includes a recess 123. The recess 123 extends into the rear panel 114 toward the filter housing 34 such that it fits approximately on top of the top member 76 of the filter housing 34 when the filter housing 34 and outlet duct 36 are connected. As described in more detail below, when the outlet duct 36 is connected to the outer shell 38, the recess 123 combines with a portion of the outer shell 38 to form a remote control holder 161. In one embodiment, shown in FIGS. 2, 16, 23, 23a and 24, the recess 123 includes a right sidewall 166, a left sidewall 168, and a bottom wall 169. The right sidewall 166 is approximately perpendicular to the rear panel 114. The left sidewall 168 extends at an angle from the rear panel 114 and defines an air hole 170. As described below, the air hole 170 forms a portion of a sensor air passage 172. The bottom sidewall 169 extends from the rear panel 114 approximately perpendicular to the rear panel 114, such that it forms a corner 180 (shown in FIG. 8) with the rear panel 114. In one embodiment, as shown in FIGS. 20, 24 and 24a, the bottom panel 169 includes a pair of downwardly extending snap fit recesses 182, 184 at the corner 180. As described below, the snap fit recesses 182, 184 combine with the outer shell 38 to form a detent for snap-fitting the remote control 200.

Figure 14:
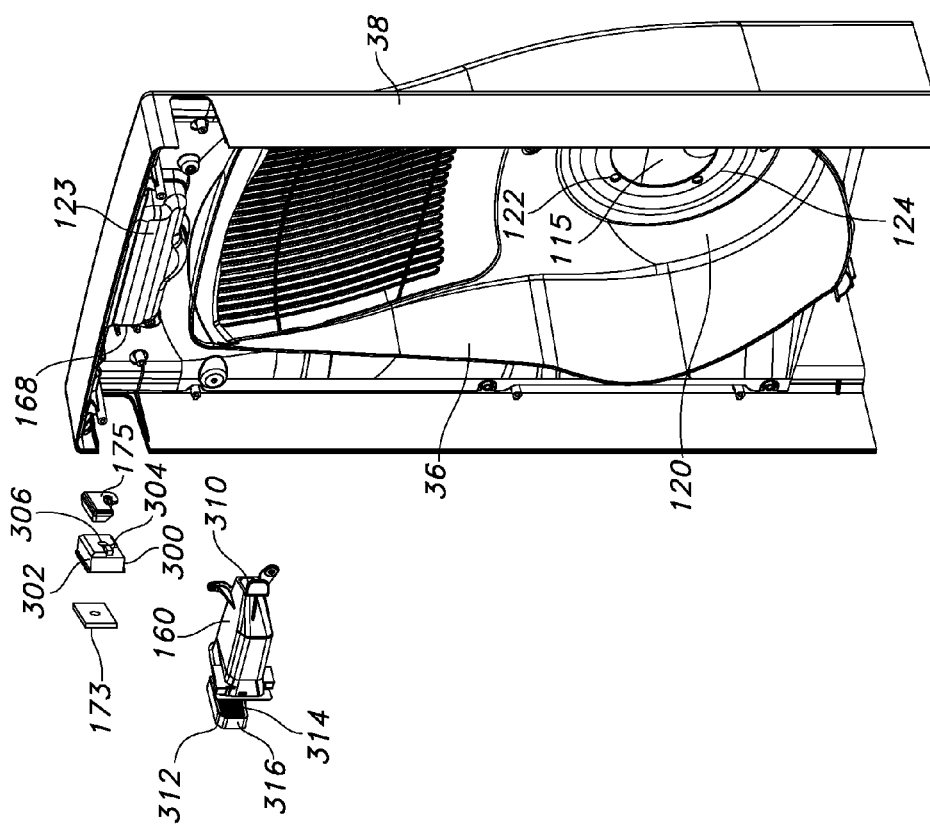
FIG. 14 is an exploded view of the components of the sensor air flow passage.
Figure 15:
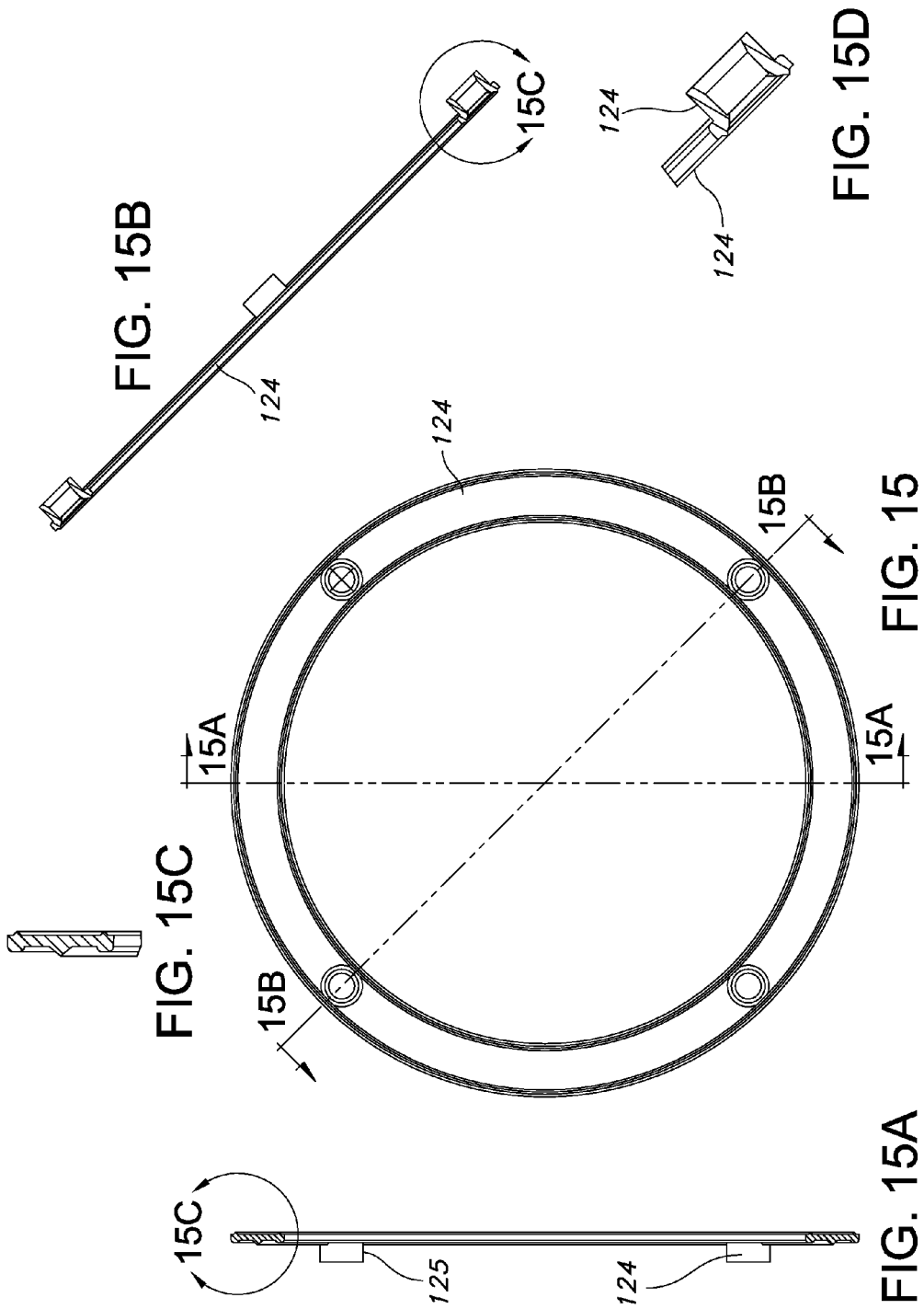
FIG. 15 is a front view of the motor gasket.
Figure 16:
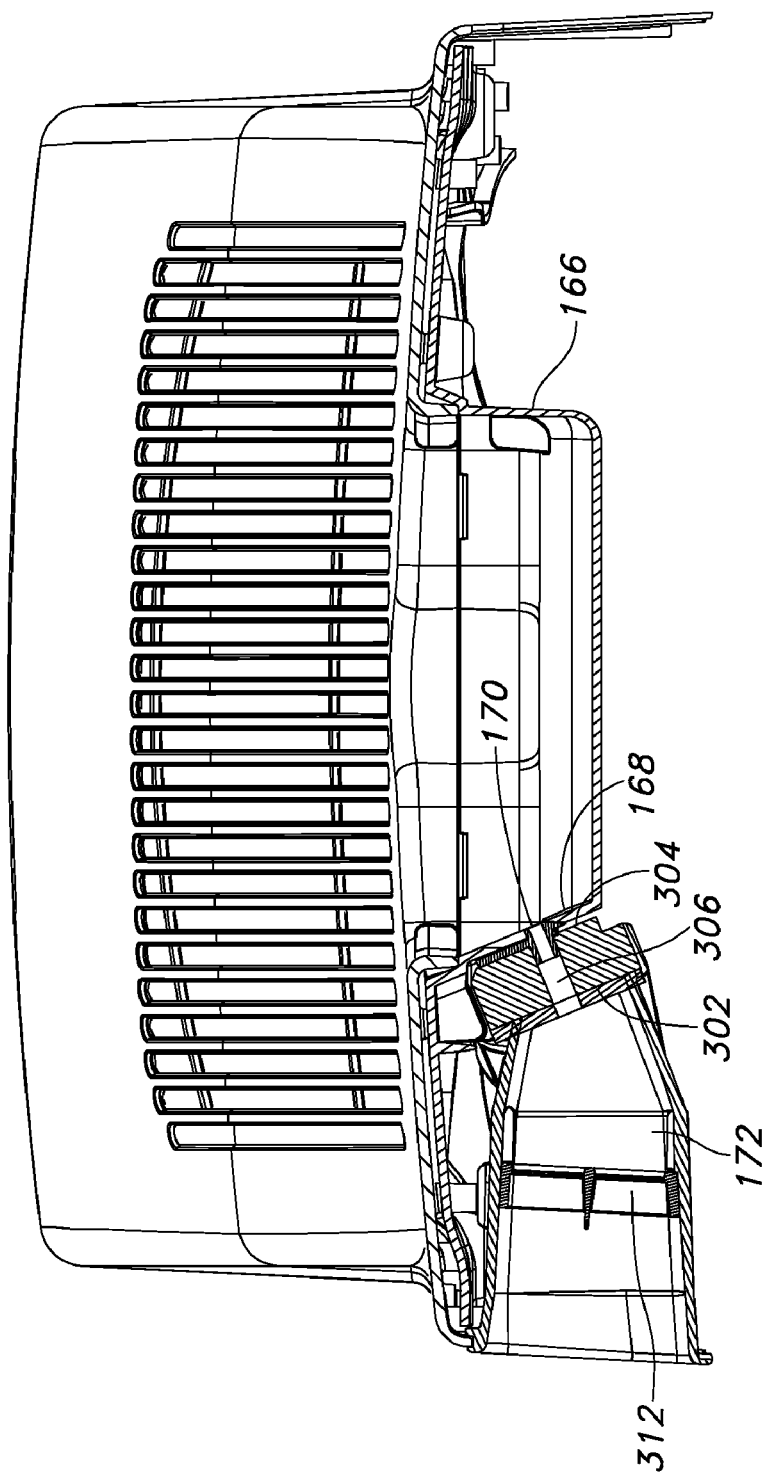
FIG. 16 is a top cross-sectional view of the sensor air flow passage.
Figures 17D, 17E:
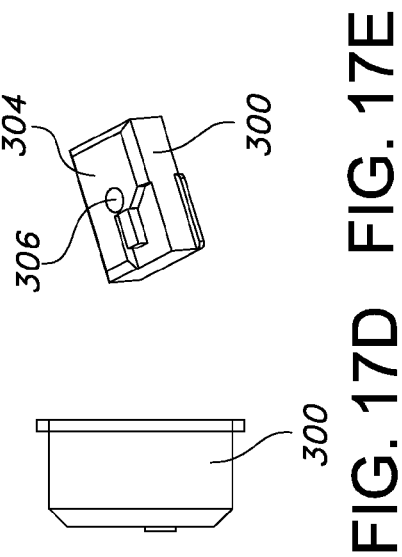
FIG. 17d is a left side view thereof.
FIG. 17e is a rear perspective view thereof.
Figures 17, 17A, 17B:
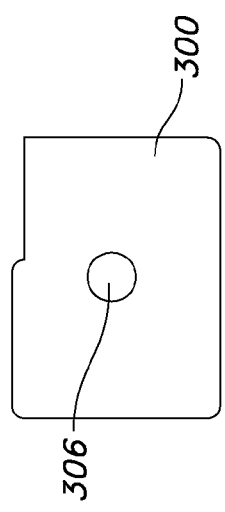
FIG. 17 is a rear view of one embodiment of a particulate sensor.
FIG. 17a is a rear view thereof.
FIG. 17b is a top view thereof.
Figure 17C:
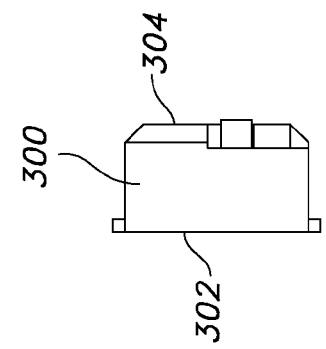
FIG. 17c is a right side view thereof.

As shown in FIG. 14, in order to provide an airtight seal, reduce noise and dampen vibration between the blower 18 and the outlet duct 36, a gasket 124 comprised of foam, rubber or another sealing material may be placed between the blower 18 (not shown in FIG. 14) and the rear panel 114. In one embodiment of the gasket 124, shown in FIGS. 15-15d, the gasket 124 may include bosses 125 that extend outwardly from the gasket 124. The bosses 125 extend into the screw holes 122 to surround the screws and ensure an airtight seal. In yet another embodiment (not shown), portions of the gasket 124 may extend through the screw holes 122 and beyond the rear surface 126 of the rear panel 114. In this embodiment, the portions extending beyond the rear surface 126 are engaged by the screw heads of the screws extending through the screw holes 122 and folded over against the rear surface 126 to provide an even better seal.

As described above and shown in FIGS. 1, 6 and 3, the blower 18 is mounted in the chamber 107 of the outlet duct 36 to the rear panel 114, and includes an impeller 128 and a DC motor 130. At least a portion of the motor 130 extends into the first cutout 115 of the rear panel 114. The impeller 128 rotates about an axis perpendicular to the rear panel 114 of the outlet duct 36, and is aligned with the cutout 62 in the filter housing 34. The impeller 128 includes a number of fins 132 that act to draw air into the blower 18. The air is drawn in through the front of the impeller 128 and then forced radially outwardly through the side of the impeller 128 and into the chamber 107. The blower 18 is controlled by the external, electronic control system 100, described below.

The rear shell 38 forms a rear surface of the air treatment system 10 and generally includes a pair of sidewalls 142 and 144 and an outer panel 146 extending between the sidewalls 142 and 144. As shown in FIG. 6, the sidewalls 142 and 144 may taper gradually from a bottom edge 148 to a top edge 150, and may include a pair of notches 152, 154 near the top edge 150. The notches 152, 154 receive handles 160, 162. The handles 160, 162 are typically molded as separate, cup shaped parts that extend into the system 10 through the notches 152, 154 in the sidewalls 142, 144 of the rear shell 38. In the assembled unit 10, the handles 160, 162 fit under the upper edge 112 of the outlet duct 36 and above the top member 76 of the filter housing. The handles 160, 162 allow a user to insert a hand into each handle in order to lift and transport the system 10. Referring now to FIG. 2, the outer panel 146 is shaped to follow the tapered contour of the sidewalls 142, 144, and includes a lower portion 202 and an upper portion 204. The upper portion 204 includes a grill 206 that aligns with the second cutout 118 for passage of exit air from the system 10. The upper portion 204 further includes a cutout 208 (shown in FIG. 2) located above the grill 206. The cutout 208 aligns with the recess 123 in the outlet duct 34.

Figure 19:
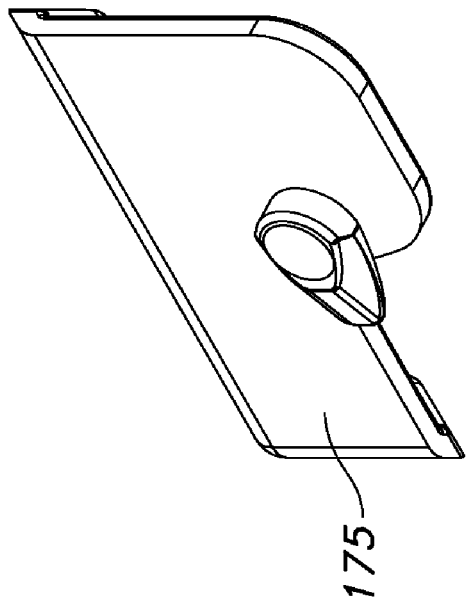
FIG. 19 is a rear perspective view of the sensor plug.
Figure 18:
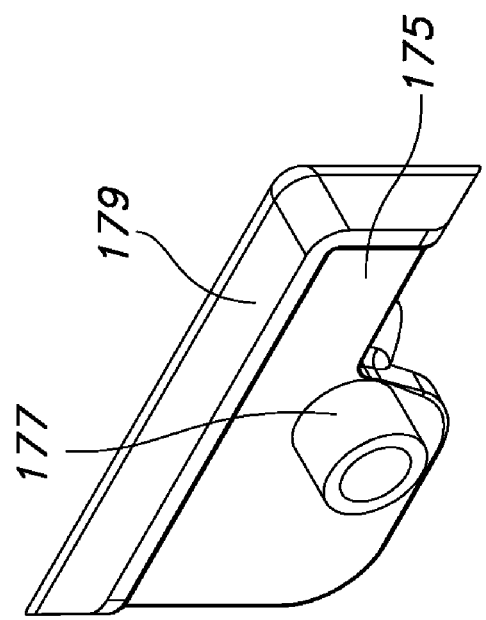
FIG. 18 is a front perspective view of the sensor plug.
Figure 21:
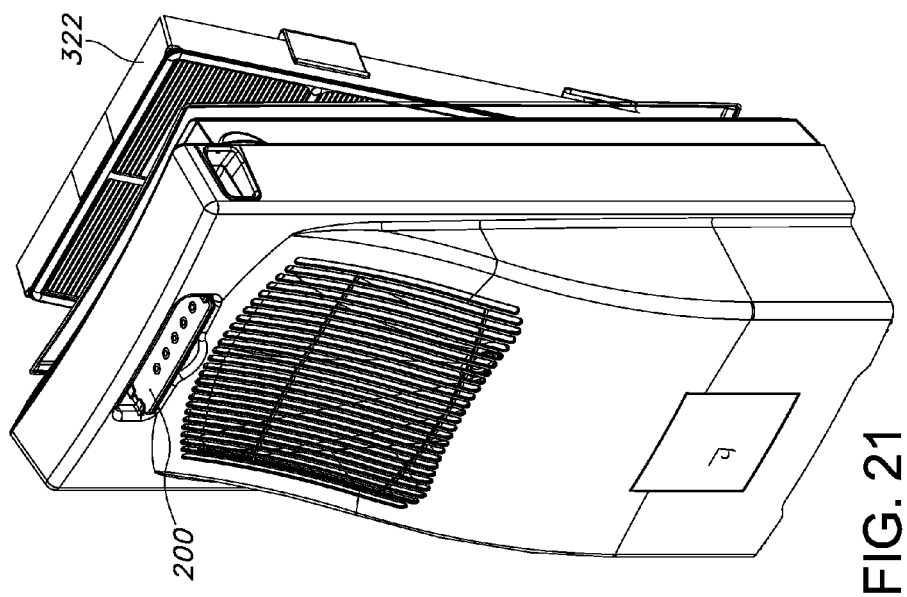
FIG. 21 is a rear perspective view of the remote in stored position.

As shown in FIGS. 8 and 14-16, the system 10 may include a sensor 300 for monitoring specific conditions of the external, ambient air. The sensor 300 is linked to the control system 100 to provide the control system 100 with information regarding the ambient air. A wide variety of sensors may be used to monitor conditions such as particulates and chemicals in the ambient air. In the illustrated embodiment, the sensor 300 is a compact particulate sensor, such as Model No. GP2Y1010AU made by SHARP. As illustrated, the sensor 300 is generally rectangular, and includes a front surface 302, a rear surface 304, a particulate through hole 306, and a terminal 308. Shown in FIGS. 14a and 15, in one embodiment the sensor 300 is located in the system 10 between the end 310 of the left handle 160 and the left sidewall 168 of the recess 123 in the outlet duct 36. In this embodiment, the particulate through hole 306 is aligned with the air hole 170 in the sidewall 168, thus forming a sensor air passage 172 for ambient air through the handle 160, sensor through hole 306, and air hole 170. A particle sensor filter 312 may be press fit into the handle 160 to filter large air particles from the sensor 300. As shown, the sensor filter 312 includes a screen 314 with a soft frame 316. The sensor air passage 172 may be sealed from the rest of the system 10 in order to prevent filtered or unfiltered air inside the housing 12 from entering the sensor air passage 172 and effecting the sensor readings of the ambient air. As shown in FIG. 14, in one embodiment a foam gasket 173 is attached to the front surface 302 of the sensor 300 and a rubber sensor plug 175 is attached to the rear surface 304 of the sensor 300. Referring now to FIGS. 18 and 19, the sensor plug 175 may be particularly formed to fit over one or more surfaces of the sensor 300, in order to more completely seal the sensor 300. As shown, a first portion 177 of the sensor plug 175 extends into the particulate through hole 306, and a second portion 179 wraps around the side of the sensor 300.

The remote control 200 is a battery-operated, infrared remote control 200 allowing remote operation of the system 10. The remote control 200 includes an upper surface 210, a lower surface 212 and first and second side edges 220, 222. The upper surface includes a plurality of control buttons 214 that allow full operation of the system 10. As shown in FIG. 22a, the lower surface 212 includes a pair of side protrusions 216 and a pair of end protrusions 218 extending from the lower surface 212. The end protrusions 218 are spaced approximately one-half the distance between the first and second side edges 220, 222.

As noted above and shown in FIGS. 20, 24, 24a, 24b, the cutout 208 in the outer shell 38 combines with the recess 123 in the outlet duct 36 to form a remote control holder 161 for the remote control 200. The cutout 208 may include a bottom surface 226 and left and right sides 228, 230. A guide rail 240 may extend from each of the sides 228, 230 a short distance above the bottom surface 226 to create a slot for insertion of the remote 200. Shown also in FIGS. 24a and 20, additional guide rails 241 may extend from the left and right sidewalls 166, 168 of the recess 123 in the outlet duct 36. The snap fit recesses 182, 184 in the recess 123 fit together with the bottom surface 226 to form a pair of detents 244, 246. When the remote control 200 is inserted into the remote control holder 161, the upper surface 210 of the remote engages the guide rails 240, 241 and the detents 244, 246 receive the end protrusions 218 on the lower surface 212 of the remote 200 such that the remote snap fits in place. The remote 200 fits in the remote control holder 161 such that a portion of the remote 200 extends through the cutout 208 and into the recess 123 of the outlet duct 36. The remote 200 may fit flush within the remote control holder 161 for storage and concealment. In addition, the cutout 208 and recess 123 may function as another handle for a user to insert a hand and transport the system 10. Because the remote control 200 is stored near the bottom 226 of the cutout 208, the handle can be used while the remote 200 is stored in the remote control holder 161. Even though the remote control holder 161 is described herein in connection with a particular air treatment system, it may be incorporated into many other air treatment systems that utilize a remote control. In addition, the bottom surface 226 may include a rounded notch 227 for enabling a user to insert a finger beneath the remote control 200 to facilitate removal from the holder 161.

The odor filter 324 is seated within the filter housing 34 such that the outer edge of the odor filter 324 engages the peripheral flange 64 of the filter housing 34. The odor filter 324 is generally rectangular and is substantially coextensive with the peripheral flange 64. The odor filter 324 preferably includes a die-cut paperboard frame 330, an activated carbon medium (not visible).

The particulate filter 322 is installed within the system 10 to remove fine particulate matter from the air. The particulate filter 322 includes a filtering media 323 and a filter frame 84, and is seated against the filter housing 34, and sealed with a sealing bead 370. The filtering media 323 is preferably a pleated HEPA filter medium. This filtering media 323 can be replaced by a meltdown polypropylene, electret-type, fiberglass or other conventional media.

Referring now to FIGS. 25-40, the particulate filter frame 84 is generally a molded thermoplastic, but may be formed from a variety of materials. According to the illustrated embodiment, filter frame 84 is comprised of a single piece of molded thermoplastic, although filter frame 84 could be comprised of multiple pieces attached together. The filter frame 84 is described herein in connection with a particular air treatment system, but may be adapted for use in many different air treatment systems that incorporate filters. As shown in FIG. 29, the filter frame 84 includes a top member 350, a bottom member 352, and opposing side members 354, 356. Each frame member includes a front surface 358 and a rear surface 360. A plurality of slats 362 may extend between the side members 354, 356 and the top and bottom members 350, 352 at the rear surfaces 360 of the frame members. The particulate filter media 323 fits within the frame members and is seated against the slats 362. It may be held in place within the frame 84 by a conventional adhesive (not shown). The frame 84 includes a number of snap hooks 70 for removably connecting the frame 84 to the filter housing 34. As illustrated, the snap hooks 70 are formed integrally with the frame 84 and are located on the side members 354, 356 approximately ¼ of length of the side members from the top member 350. In this embodiment, shown in FIG. 30, a first portion 351 extends outwardly from the front surface 358 of the side members 354, 356 and include a radiused curve 364 and an elongated portion 366 extending from the curve 364 alongside the side members 354, 356 of the frame 84 past the rear surface 360 of the frame 84. The elongated portion 366 includes a barbed end 368. Shown in FIG. 27, the barbed end 368 may be inserted into the slots 68 in the peripheral flange 64 of the filter housing 34. The radiused curve 364 may act as a hinge such that the snap hooks 70 may be flexed to facilitate insertion and removal of the snap hooks 70 from the slots 68. In an alternative embodiment, the slots 68 could be included on the filter frame 84 and the snap hooks 70 could extend from the filter housing 34. The rear surface 360 of the frame may additionally include a sealing bead 370 (shown in FIGS. 33 and 34) that extends around the frame 84 and engages the filter housing 34 to create an airtight seal between the frame 84 and the filter housing 34. The odor filter 324 is trapped between the protrusions 104 of filter housing 34 and particulate filter 322. Each snap hook 70 may additionally include a slot receptacle 372 in the first portion 351 of the snap hook 70 for receiving corresponding tabs 380 on the prefilter 320. The frame 84 may include additional protrusions 382 including slot receptacles 384 for receiving additional corresponding tabs 380 on the prefilter 320. As shown in FIG. 28, the bottom member 352 may include one or more outwardly extending protrusions 82 for extending into the slots 78 in the bottom member 80 of the peripheral flange 64 of the filter housing 34. As illustrated, two protrusions 82 are spaced along the bottom member 352. The protrusions 82 may have a curved surface to accommodate inserting the protrusions 82 into the slots 78 and rotating the frame 84 into place. The filter frame 84 could include snap hooks 70 located on one or more of the top member 350 and the bottom member 352.

In operation, the particulate filter 322 is installed into the system 10 by inserting the protrusions 82 of the frame 84 into the slots 78 on the filter housing 34 with the top of the filter frame angled away from the filter housing 34. The top portion of the filter frame 84 is then rotated toward the filter housing 34 so the snap hooks 70 are aligned with the slots 68 near the top of the filter housing 34. The snap hooks 70 are inserted into the slots 68 such that the barbs 368 snap fit into the slots 68. The positioning and fit of the snap hooks 70 near the top of the filter frame 84 enable the sealing bead 370 to form an airtight seal with the filter housing 34. Removal of the particulate filter 322 is done by flexing the snap hooks 70 to disengage the barbs 368 and then rotating the filter frame 84 opposite the direction of insertion.

As noted above, the prefilter 320 removably attaches to the front surface 358 of the particulate filter frame 84 in order to remove relatively coarse particles from the air as the air enters the system 10. By removing coarse particulate matter, the prefilter 320 protects the particulate filter 322. The prefilter 320 includes a screen (not shown) secured to a polymeric support structure 392. In one embodiment, the screen is a woven polymer, but it may be wire mesh or another type of screen. The support structure 392 includes a plurality of mounting tabs 380 adapted to fit within the slot receptacles 372, 384 on the front surface 350 of the filter frame 84 to secure the prefilter 320 in place over particulate filter 322.

As noted above, the system 10 is operated by an electronic control system 100. As illustrated, the control system 100 is mounted to the top member 76 of the filter housing 34 and the upper edge 112 of the outlet duct 36, and includes a conventional circuit board having conventional DC motor control circuitry (not shown) that controls operation of the blower 18, conventional timing and recording circuitry (not shown) that monitors the life of the particulate and odor filters, conventional non-volatile memory (e.g. EPROM) (not shown) in which filter data in stored in the event of a power failure, and conventional input circuitry (not shown) that allows the user to select the desired operating parameters. The user operates the control system 100 by manipulation of a control panel 396 or the wireless remote control 200.

Air Flow Path

In operation, the blower 18 is actuated to draw external air into the system 10 through the front shield 30 and through the prefilter 320, particulate filter 322, and odor filter 324. As the air passes through the filters, each of the filters operate to remove particulates and odors from the air as described above. The air is then drawn in through the finger guard 90, front of the impeller 128, and forced radially outwardly through the side of the impeller 128 and into the chamber 107 in the outlet duct 36. The high velocity, filtered air is then forced upward and out of the second cutout 118 in the outlet duct 36 and exits the system 10 through the grill 206 in the rear shell 38. Air circulates around the room in which the system 10 is operated by flowing into the front of the system 10 and then upward and out the rear of the system 10.

As the high velocity, filtered air exits the system 10, it flows directly past the cutout 208 at the top of the rear shell 38 and past the air hole 170 of the sensor air passage 172. This high velocity air flow over the cutout 208 creates a low pressure region near the air hole 170 that acts to draw external, ambient air through the handle 168 and through the sensor air passage 172. In the illustrated embodiment, approximately $\frac{1}{1000}$ of the air volume that is drawn through the system 10 is drawn through the sensor air passage 172. Because the sensor air passage 172 is sealed from the rest of the system 10, neither filtered nor unfiltered air from inside the system can enter the sensor air passage 172 to effect the information gathered by the sensor 300. Further, because the sensor air passage 172 is not positioned directly in the air flow path of the system 10, it does not reduce the amount of clean air delivered by the system and does not effect the efficiency of the system 10. Although described in connection with this particular air treatment system, this feature of using an air stream to create a low pressure area and draw air through a sensor may be otherwise incorporated into many different air treatment systems.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:
1. An air treatment system comprising:
   a housing defining an interior, said interior including a top and a bottom;
   a blower having an impeller, said impeller operable to rotate about an axis and to draw air through said blower along said axis;
   a screen positioned adjacent to said impeller, said screen including a plurality of strands having a strand thickness that is angled with respect to said axis such that air flows through said screen at an angle with respect to said axis as a result of the angle of said strands; and
   means for locating said screen with respect to said blower such that said angled strands are oriented in a particular direction, wherein said angle of said strand thickness is oriented in a direction that causes air to be drawn through said strands from said top portion of said interior of said housing.
2. The air treatment system of claim 1 including a housing for supporting said blower and said screen, said housing including a first connector means, and wherein said screen includes a second connector means, said second connector means keyed to the angle of said angled strands, such that when said first and second connector means are aligned, said strands are located in said particular direction.
3. The air treatment system of claim 2 wherein said first connector means includes at least one screw boss extending from said housing, and wherein said second connector means include at least one screw hole in said screen.

4. The air treatment system of claim 2 wherein said screen defines a notch, and wherein said housing includes a tab extending therefrom, said notch keyed to the angle of said angled strands and sized to receive said tab, said tab positioned to orient said strands in said particular direction when fitted with said notch of said screen.

5. The air treatment system of claim 1 wherein said screen is an expanded metal mesh.

6. The air treatment system of claim 5 wherein said screen includes a periphery and a central portion, and wherein said plurality of strands intersect, and are held together about said periphery.

7. The air treatment system of claim 6 wherein said screen includes a contoured surface, such that said screen is in contact with said housing at least at a portion of said periphery, said screen extending away from said impeller in said central portion.

8. An air treatment system comprising:
 a housing having a first attachment element, a top portion and a bottom portion;
 a blower supported by said housing, said blower having a blower inlet and a blower outlet, said blower including an impeller that is rotatable about an axis, whereby said impeller is capable of drawing air through said blower inlet along said axis; and
 a screen positioned over said blower inlet, said screen including a plurality of strands having a strand thickness and a strand width, wherein said strand thickness is greater than said strand width, said strands being angled in the same general direction with respect to said impeller axis such that air flows through said screen at an angle with respect to said axis as a result of the angle of said strands, said screen including a second attachment element that is keyed with respect to the angle of said strands, whereby said second attachment element aligns with said first attachment element to orient said strands in a predetermined direction, wherein said angle of said strands is oriented in a direction that causes air to be drawn through said strands from said top portion of said interior of said housing.

9. The air treatment system of claim 8 wherein said first attachment element includes a plurality of bosses and a protrusion positioned on said housing and said second attachment element includes a plurality of fastener holes and a cutout defined in said screen, said bosses aligning with said fastener holes and said protrusion extending into said cutout to orient said strands in said predetermined direction.

10. The air treatment system of claim 9 wherein said screen is an expanded metal mesh having a peripheral ring extending around said expanded metal mesh, said fastener holes and said cutout positioned on said peripheral ring.

11. The air treatment system of claim 8 wherein said housing defines a blower cutout, said blower positioned within said blower cutout, said housing including a foot adapted to engage a ground surface, a lower portion extending from said foot, and an upper portion extending upwardly from said lower portion, said cutout positioned within said lower portion, said strands of said screen each including a rear edge facing said blower and a front edge opposite said rear edge, said strands being oriented such that said front edge of said strands is nearer to said upper portion of said housing than said rear edge.

12. The air treatment system of claim 11 wherein said screen includes central portion having a contoured surface, such that said screen is in contact with said housing at least at a portion of said peripheral ring, a portion of said screen extending away from said blower inlet in said central portion.

* * * * *